United States Patent
Wan et al.

(10) Patent No.: US 11,355,969 B2
(45) Date of Patent: Jun. 7, 2022

(54) WIRELESS CHARGING DEVICE, WIRELESS CHARGING METHOD AND DEVICE TO BE CHARGED

(71) Applicant: Guangdong Oppo Mobile Telecommunications Corp., Ltd., Guangdong (CN)

(72) Inventors: Shiming Wan, Guangdong (CN); Jialiang Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 160 days.

(21) Appl. No.: 16/271,131

(22) Filed: Feb. 8, 2019

(65) Prior Publication Data
US 2019/0190321 A1    Jun. 20, 2019

Related U.S. Application Data

(63) Continuation of application No. PCT/CN2017/085990, filed on May 25, 2017.

(30) Foreign Application Priority Data

Apr. 7, 2017  (WO) ................ PCT/CN2017/079784
Apr. 7, 2017  (WO) ................ PCT/CN2017/079786

(51) Int. Cl.
*H02J 7/00* (2006.01)
*H02J 50/80* (2016.01)
(Continued)

(52) U.S. Cl.
CPC ............. *H02J 50/80* (2016.02); *H02J 7/025* (2013.01); *H02J 7/045* (2013.01); *H02J 50/10* (2016.02);
(Continued)

(58) Field of Classification Search
USPC ....................................................... 320/108
See application file for complete search history.

(56) References Cited

U.S. PATENT DOCUMENTS

| 3,694,668 A | 9/1972 | Bunker |
| 4,641,089 A | 2/1987 | Huggins |

(Continued)

FOREIGN PATENT DOCUMENTS

| CN | 2464002 Y | 12/2001 |
| CN | 1551444 A | 12/2004 |

(Continued)

OTHER PUBLICATIONS

English translation of Rejection issued in corresponding KR application No. 10-2019-7007549 dated Mar. 26, 2020.
(Continued)

*Primary Examiner* — Samuel Berhanu
(74) *Attorney, Agent, or Firm* — Young Basile Hanlon & MacFarlane, P.C.

(57) ABSTRACT

A wireless charging device, a wireless charging method, and a device to be charged are provided. The wireless charging device includes a wireless transmission circuit, a first communication control circuit, an external interface, and a wireless data transmission circuit. The wireless charging method includes conducting, by a wireless charging device, wireless communication with a device to be charged during wireless charging to adjust transmission power of a wireless transmission circuit of the wireless charging device, to make at least one of an output voltage and an output current of a wireless reception circuit of the device to be charged match a present charging stage of a battery of the device to be charged.

6 Claims, 6 Drawing Sheets

(51) Int. Cl.
 *H04B 5/00* (2006.01)
 *H02J 7/02* (2016.01)
 *H02J 50/10* (2016.01)
 *H02J 7/04* (2006.01)
(52) U.S. Cl.
 CPC ........ *H04B 5/0037* (2013.01); *H02J 7/00034* (2020.01)

(56) References Cited

U.S. PATENT DOCUMENTS

| | | | |
|---|---|---|---|
| 5,057,793 A | 10/1991 | Cowley |
| 5,173,665 A | 12/1992 | Norimatsu |
| 5,187,615 A | 2/1993 | Miyazawa et al. |
| 5,402,274 A | 3/1995 | Miyazawa et al. |
| 5,559,645 A | 9/1996 | Miyazawa et al. |
| 5,808,447 A | 9/1998 | Hagino |
| 6,087,810 A | 7/2000 | Yoshida |
| 6,329,786 B1 | 12/2001 | Ono |
| 7,812,277 B2 | 10/2010 | Buhler et al. |
| 7,962,222 B2 | 6/2011 | He et al. |
| 7,999,484 B2 | 8/2011 | Jurngwirth et al. |
| 8,102,147 B2 | 1/2012 | Jung |
| 8,115,461 B2 | 2/2012 | Yoshio |
| 8,120,412 B2 | 2/2012 | Pelley |
| 8,129,942 B2 | 3/2012 | Park |
| 8,427,121 B2 | 4/2013 | Notman |
| 8,461,817 B2 | 6/2013 | Martin |
| 8,527,688 B2 | 9/2013 | Chatterjee |
| 8,928,284 B2 | 1/2015 | Carobolante |
| 9,065,331 B2 | 6/2015 | Xu |
| 9,088,165 B2 | 7/2015 | Yamamoto et al. |
| 9,099,239 B2 | 8/2015 | Abe |
| 9,124,309 B2 | 9/2015 | Jung |
| 9,142,995 B2 | 9/2015 | Jung |
| 9,155,900 B2 | 10/2015 | Meskens |
| 9,178,389 B2 | 11/2015 | Hwang |
| 9,178,441 B2 | 11/2015 | Daly |
| 9,197,070 B2 | 11/2015 | Jung |
| 9,225,177 B2 | 12/2015 | Jung |
| 9,318,915 B2 | 4/2016 | Miller |
| 9,362,782 B2 | 6/2016 | Tanabe |
| 9,379,570 B2 | 6/2016 | Tanabe |
| 9,379,571 B2 | 6/2016 | Boyer et al. |
| 9,444,247 B2 | 9/2016 | Kim |
| 9,461,502 B2 | 10/2016 | Lee et al. |
| 9,482,723 B2 | 11/2016 | Hada |
| 9,496,732 B2 | 11/2016 | Partovi |
| 9,559,548 B2 | 1/2017 | Kwon et al. |
| 9,561,730 B2 | 2/2017 | Widmer et al. |
| RE46,391 E | 5/2017 | Jung |
| RE46,392 E | 5/2017 | Jung |
| 9,680,531 B2 | 6/2017 | Tavakoli Shiraji et al. |
| 9,687,663 B2 | 6/2017 | He et al. |
| 9,699,838 B2 | 7/2017 | Xu |
| 9,707,853 B2 | 7/2017 | Boyer et al. |
| 9,728,980 B2 | 8/2017 | Jung |
| 9,728,989 B2 | 8/2017 | Kim |
| 9,787,125 B2 | 10/2017 | Ji |
| 9,787,130 B2 | 10/2017 | Kim et al. |
| 9,845,019 B2 | 12/2017 | Okamoto |
| 9,859,594 B2 | 1/2018 | Miller et al. |
| 9,871,386 B2 | 1/2018 | Desrosiers et al. |
| 9,876,374 B2 | 1/2018 | Baek et al. |
| 9,941,795 B1 | 4/2018 | Mayega et al. |
| 9,973,017 B2 | 5/2018 | Kudo et al. |
| 9,973,021 B2 | 5/2018 | Leabman et al. |
| 9,991,753 B2 | 6/2018 | Miller et al. |
| 10,008,874 B2 | 6/2018 | Green |
| 10,056,790 B2 | 8/2018 | Miller et al. |
| 10,110,074 B2 | 10/2018 | Jung |
| 10,118,045 B2 | 11/2018 | He et al. |
| 10,148,096 B2 | 12/2018 | Muratov et al. |
| 10,170,926 B2 | 1/2019 | Lee et al. |
| 10,181,741 B2 | 1/2019 | Saeki et al. |
| 10,199,872 B2 | 2/2019 | Jung et al. |
| 10,220,715 B2 | 3/2019 | Tsukamoto |
| 10,224,763 B2 | 3/2019 | Abe et al. |
| 10,263,472 B2 | 4/2019 | Sugiyama et al. |
| 10,270,339 B2 | 4/2019 | Lee |
| 10,277,050 B2 | 4/2019 | Huang et al. |
| 10,277,082 B2 | 4/2019 | Murayama |
| 10,284,002 B2 | 5/2019 | Lee et al. |
| 10,286,799 B2 | 5/2019 | Namou et al. |
| 10,305,334 B2 | 5/2019 | Murayama et al. |
| 10,326,298 B2 | 6/2019 | Lee et al. |
| 10,333,348 B2 | 6/2019 | Onishi |
| 10,340,751 B2 | 7/2019 | Jung |
| 10,353,492 B2 | 7/2019 | Chan et al. |
| 10,355,527 B2 | 7/2019 | Tseng et al. |
| 10,374,450 B2 | 8/2019 | Kim et al. |
| 10,381,879 B2 | 8/2019 | Park |
| 10,498,220 B2 | 12/2019 | Nagaoka |
| 10,505,380 B2 | 12/2019 | Zhang |
| 10,516,273 B2 | 12/2019 | Desrosiers et al. |
| 10,529,484 B2 | 1/2020 | Leem |
| 10,574,079 B1 | 2/2020 | Berkowitz et al. |
| 10,601,240 B2 | 3/2020 | Onishi |
| 10,620,679 B2 | 4/2020 | Sultenfuss et al. |
| 10,658,854 B2 | 5/2020 | Zhang |
| 10,670,469 B2 | 6/2020 | Ryu et al. |
| 10,784,708 B2 | 9/2020 | Lee et al. |
| 10,797,502 B2 | 10/2020 | Fan et al. |
| 10,797,538 B2 | 10/2020 | Kim et al. |
| 10,804,728 B2 | 10/2020 | Kim et al. |
| 10,804,738 B2 | 10/2020 | Huang et al. |
| 10,819,121 B2 | 10/2020 | Zhang |
| 10,897,156 B2 | 1/2021 | Bando et al. |
| 10,938,228 B2 | 3/2021 | Zhang |
| 10,974,055 B2 | 4/2021 | He et al. |
| 10,998,751 B2 | 5/2021 | Wan et al. |
| 11,201,509 B2 | 12/2021 | Wan et al. |
| 2004/0080891 A1 | 4/2004 | Shyr |
| 2006/0103355 A1 | 5/2006 | Patino |
| 2007/0023399 A1 | 2/2007 | Buhler et al. |
| 2007/0129768 A1 | 6/2007 | He et al. |
| 2007/0139012 A1 | 6/2007 | Hayashigawa |
| 2008/0054855 A1 | 3/2008 | Hussain et al. |
| 2008/0100272 A1 | 5/2008 | Yoshio |
| 2008/0211455 A1 | 9/2008 | Park |
| 2009/0067208 A1 | 3/2009 | Martin |
| 2009/0134817 A1 | 5/2009 | Jurngwirth et al. |
| 2009/0140691 A1 | 6/2009 | Jung |
| 2009/0309547 A1 | 12/2009 | Nakatsuji |
| 2010/0146308 A1 | 6/2010 | Gioscia |
| 2011/0029792 A1 | 2/2011 | Nakano |
| 2011/0032026 A1 | 2/2011 | Pelley |
| 2011/0057607 A1 | 3/2011 | Carobolante |
| 2011/0156655 A1* | 6/2011 | Kim ............ H01M 10/441 320/134 |
| 2011/0164471 A1 | 7/2011 | Baarman et al. |
| 2011/0208269 A1 | 8/2011 | He et al. |
| 2011/0254377 A1 | 10/2011 | Wildmer et al. |
| 2011/0316477 A1 | 12/2011 | Jung |
| 2012/0104997 A1* | 5/2012 | Carobolante ........... H02J 50/12 320/108 |
| 2012/0146576 A1 | 6/2012 | Partovi |
| 2012/0181973 A1 | 7/2012 | Lyden |
| 2012/0205988 A1 | 8/2012 | Tanabe |
| 2012/0235636 A1 | 9/2012 | Partovi |
| 2012/0293009 A1 | 11/2012 | Kim |
| 2012/0300413 A1 | 11/2012 | Iida |
| 2013/0002026 A1 | 1/2013 | Mizutani et al. |
| 2013/0002202 A1 | 1/2013 | Kuraishi |
| 2013/0015812 A1 | 1/2013 | Boyer et al. |
| 2013/0026981 A1 | 1/2013 | Van Der Lee |
| 2013/0033235 A1 | 2/2013 | Fukaya |
| 2013/0050889 A1 | 2/2013 | Hwang |
| 2013/0093389 A1 | 4/2013 | Partovi |
| 2013/0093390 A1 | 4/2013 | Partovi |
| 2013/0099591 A1 | 4/2013 | Yeo et al. |
| 2013/0099592 A1 | 4/2013 | Abe |
| 2013/0119778 A1 | 5/2013 | Jung |
| 2013/0140906 A1 | 6/2013 | Tanabe |

(56) References Cited

U.S. PATENT DOCUMENTS

| | | |
|---|---|---|
| 2013/0193912 A1 | 8/2013 | Bornhoft |
| 2013/0207601 A1 | 8/2013 | Wu et al. |
| 2013/0234658 A1 | 9/2013 | Endo et al. |
| 2013/0249479 A1 | 9/2013 | Partovi |
| 2013/0271069 A1 | 10/2013 | Partovi |
| 2013/0285604 A1 | 10/2013 | Partovi |
| 2013/0285605 A1 | 10/2013 | Partovi |
| 2013/0285620 A1 | 10/2013 | Yamamoto et al. |
| 2013/0300355 A1 | 11/2013 | Jung |
| 2013/0334883 A1 | 12/2013 | Kim et al. |
| 2014/0009080 A1 | 1/2014 | Xu |
| 2014/0009120 A1 | 1/2014 | Kim |
| 2014/0139176 A1 | 5/2014 | Ji |
| 2014/0191568 A1 | 7/2014 | Partovi |
| 2014/0247052 A1 | 9/2014 | Hada |
| 2014/0319925 A1 | 10/2014 | Jung |
| 2014/0319926 A1 | 10/2014 | Jung |
| 2014/0329472 A1 | 11/2014 | Kovacs et al. |
| 2014/0333259 A1 | 11/2014 | Akiyoshi et al. |
| 2014/0379047 A1 | 12/2014 | Meskens |
| 2015/0015180 A1 | 1/2015 | Miller et al. |
| 2015/0054456 A1 | 2/2015 | Yamakawa et al. |
| 2015/0155718 A1 | 6/2015 | Jung |
| 2015/0171639 A1 | 6/2015 | Saeki et al. |
| 2015/0214748 A1* | 7/2015 | Lin .................. H02J 5/005 307/104 |
| 2015/0236538 A1 | 8/2015 | Cai et al. |
| 2015/0245434 A1 | 8/2015 | Xu |
| 2015/0256021 A1 | 9/2015 | Kwon et al. |
| 2015/0357851 A1* | 12/2015 | Huang ............. H02M 3/158 320/108 |
| 2015/0365136 A1 | 12/2015 | Miller et al. |
| 2015/0365137 A1 | 12/2015 | Miller et al. |
| 2015/0365737 A1 | 12/2015 | Miller et al. |
| 2016/0006267 A1 | 1/2016 | Muratov et al. |
| 2016/0020630 A1 | 1/2016 | Tseng et al. |
| 2016/0020643 A1 | 1/2016 | Abe et al. |
| 2016/0036497 A1 | 2/2016 | Tavakoli Shiraji et al. |
| 2016/0049825 A1* | 2/2016 | Green ................ H02J 7/025 320/108 |
| 2016/0056641 A1 | 2/2016 | Hwang et al. |
| 2016/0056664 A1 | 2/2016 | Partovi |
| 2016/0087462 A1 | 3/2016 | Kudo et al. |
| 2016/0099601 A1 | 4/2016 | Leabman et al. |
| 2016/0141891 A1 | 5/2016 | Jung |
| 2016/0197495 A1 | 7/2016 | Jung |
| 2016/0239070 A1 | 8/2016 | Oto |
| 2016/0254689 A1 | 9/2016 | Lee |
| 2016/0261121 A1 | 9/2016 | Baek et al. |
| 2016/0264010 A1 | 9/2016 | Boyer et al. |
| 2016/0268833 A1 | 9/2016 | Lee et al. |
| 2016/0280078 A1 | 9/2016 | Tsukamoto |
| 2016/0299521 A1 | 10/2016 | Akram |
| 2016/0320867 A1 | 11/2016 | Chan et al. |
| 2016/0355095 A1* | 12/2016 | Okamoto ............. B60L 53/65 |
| 2016/0380467 A1 | 12/2016 | Shao et al. |
| 2016/0380485 A1 | 12/2016 | Murayama |
| 2017/0018973 A1 | 1/2017 | Murayama et al. |
| 2017/0033590 A1 | 2/2017 | Lee et al. |
| 2017/0040810 A1 | 2/2017 | Hu et al. |
| 2017/0054328 A1 | 2/2017 | Jung et al. |
| 2017/0063161 A1 | 3/2017 | Sugiyama et al. |
| 2017/0085108 A1 | 3/2017 | Zhang |
| 2017/0093225 A1 | 3/2017 | Murayama et al. |
| 2017/0126021 A1 | 5/2017 | Desrosiers et al. |
| 2017/0126283 A1 | 5/2017 | Rehm |
| 2017/0244264 A1 | 8/2017 | Zhang |
| 2017/0250553 A1 | 8/2017 | Zhang et al. |
| 2017/0250564 A1 | 8/2017 | Kim et al. |
| 2017/0281950 A1 | 10/2017 | He et al. |
| 2018/0013315 A1 | 1/2018 | Kim et al. |
| 2018/0034305 A1* | 2/2018 | Lee .................. H02J 7/007192 |
| 2018/0041060 A1 | 2/2018 | Walley et al. |
| 2018/0102652 A1 | 4/2018 | Desrosiers et al. |
| 2018/0115179 A1* | 4/2018 | Fan ................... H02J 50/10 |
| 2018/0123395 A1 | 5/2018 | Onishi |
| 2018/0269722 A1 | 9/2018 | Xu et al. |
| 2018/0278073 A1 | 9/2018 | Zhang |
| 2018/0316225 A1 | 11/2018 | Yeo et al. |
| 2018/0358841 A1 | 12/2018 | Park |
| 2019/0030344 A1 | 1/2019 | He et al. |
| 2019/0089175 A1 | 3/2019 | Zhang |
| 2019/0097441 A1 | 3/2019 | Chen et al. |
| 2019/0097451 A1 | 3/2019 | Lee et al. |
| 2019/0140470 A1 | 5/2019 | Wan et al. |
| 2019/0145833 A1 | 5/2019 | Ryu et al. |
| 2019/0148968 A1 | 5/2019 | Kim et al. |
| 2019/0165613 A1 | 5/2019 | Jung et al. |
| 2019/0190321 A1 | 6/2019 | Wan et al. |
| 2019/0267850 A1 | 8/2019 | Jung |
| 2019/0280506 A1 | 9/2019 | Huang et al. |
| 2019/0305580 A1 | 10/2019 | Lee et al. |
| 2019/0324559 A1 | 10/2019 | Chan et al. |
| 2019/0356154 A1 | 11/2019 | Wan et al. |
| 2019/0356156 A1 | 11/2019 | Wan et al. |
| 2019/0363567 A1 | 11/2019 | Kim et al. |
| 2019/0372387 A1 | 12/2019 | Wan et al. |
| 2019/0372404 A1 | 12/2019 | Lin et al. |
| 2019/0379245 A1 | 12/2019 | Wan |
| 2019/0386505 A1 | 12/2019 | Lin et al. |
| 2019/0386516 A1 | 12/2019 | Wan et al. |
| 2020/0014235 A1 | 1/2020 | Lin et al. |
| 2020/0014252 A1 | 1/2020 | Wan et al. |
| 2020/0021129 A1 | 1/2020 | Lin et al. |
| 2020/0021130 A1 | 1/2020 | Wan |
| 2020/0021148 A1 | 1/2020 | Lin et al. |
| 2020/0036215 A1 | 1/2020 | Wan |
| 2020/0036216 A1 | 1/2020 | Wan |
| 2020/0036218 A1 | 1/2020 | Maalouf et al. |
| 2020/0091731 A1 | 3/2020 | Desrosiers et al. |
| 2020/0091780 A1 | 3/2020 | Lee et al. |
| 2020/0144871 A1 | 5/2020 | Wan |
| 2020/0366116 A1 | 11/2020 | Yang |
| 2020/0366134 A1 | 11/2020 | Wan |
| 2020/0412169 A1 | 12/2020 | Chen et al. |
| 2020/0412180 A1 | 12/2020 | Qiao et al. |
| 2021/0006089 A1 | 1/2021 | Wan |
| 2021/0006097 A1 | 1/2021 | Lee et al. |
| 2021/0006100 A1 | 1/2021 | Kim et al. |
| 2021/0036525 A1 | 2/2021 | Kim et al. |
| 2021/0066952 A1 | 3/2021 | Chen et al. |
| 2021/0066963 A1 | 3/2021 | Wan |
| 2021/0075244 A1 | 3/2021 | Cho et al. |
| 2021/0091599 A1 | 3/2021 | Liu et al. |
| 2021/0099006 A1 | 4/2021 | Wan |
| 2021/0119463 A1 | 4/2021 | Zhang |
| 2021/0119487 A1 | 4/2021 | Choi et al. |

FOREIGN PATENT DOCUMENTS

| | | |
|---|---|---|
| CN | 101233666 A | 7/2008 |
| CN | 102013717 A | 4/2011 |
| CN | 102522799 A | 6/2012 |
| CN | 103001297 A | 3/2013 |
| CN | 103036282 A | 4/2013 |
| CN | 103078381 A | 5/2013 |
| CN | 202998182 U | 6/2013 |
| CN | 103269108 A | 8/2013 |
| CN | 103944243 A | 7/2014 |
| CN | 104037918 A | 9/2014 |
| CN | 104283293 A | 1/2015 |
| CN | 104467130 A | 3/2015 |
| CN | 104578209 A | 4/2015 |
| CN | 104600869 A | 5/2015 |
| CN | 104617632 A | 5/2015 |
| CN | 104752046 A | 7/2015 |
| CN | 105098900 A | 11/2015 |
| CN | 105148402 A | 12/2015 |
| CN | 105226779 A | 1/2016 |
| CN | 105337384 A | 2/2016 |
| CN | 105471001 A | 4/2016 |
| CN | 105529802 A | 4/2016 |
| CN | 104283293 B | 6/2016 |
| CN | 205355893 U | 6/2016 |

(56) References Cited

FOREIGN PATENT DOCUMENTS

| | | |
|---|---|---|
| CN | 105826066 A | 8/2016 |
| CN | 105896670 A | 8/2016 |
| CN | 105978049 A | 9/2016 |
| CN | 106026237 A | 10/2016 |
| CN | 106026327 A | 10/2016 |
| CN | 106169798 A | 11/2016 |
| CN | 106169799 A | 11/2016 |
| CN | 106300539 A | 1/2017 |
| CN | 106451705 A | 2/2017 |
| CN | 106505751 A | 3/2017 |
| EP | 1763125 A2 | 3/2007 |
| EP | 1821383 A2 | 8/2007 |
| EP | 2590300 A1 | 5/2013 |
| EP | 2824797 A1 | 1/2015 |
| EP | 3068017 A2 | 9/2016 |
| EP | 3113329 A1 | 1/2017 |
| EP | 3133746 A1 | 2/2017 |
| JP | H09121462 A | 5/1997 |
| JP | 2007129862 A | 5/2007 |
| JP | 2009504117 A | 1/2009 |
| JP | 2011034306 A | 2/2011 |
| JP | 2011120361 A | 6/2011 |
| JP | 2012249410 A | 12/2012 |
| JP | 2013038854 A | 2/2013 |
| JP | 2013115859 A | 6/2013 |
| JP | 2013183496 A | 9/2013 |
| JP | 2013230007 A | 11/2013 |
| JP | 2016015862 A | 1/2016 |
| JP | 2016063725 A | 4/2016 |
| JP | 2016063726 A | 4/2016 |
| JP | 2016092986 A | 5/2016 |
| JP | 2016123162 A | 7/2016 |
| JP | 2016152722 A | 8/2016 |
| JP | 2017046521 A | 3/2017 |
| JP | 2017060328 A | 3/2017 |
| KR | 100792311 B1 | 1/2008 |
| KR | 20080095642 A | 10/2008 |
| KR | 20120092038 A | 8/2012 |
| KR | 20130007985 A | 1/2013 |
| KR | 20130023618 A | 3/2013 |
| KR | 101270675 B1 | 6/2013 |
| KR | 20130124698 B1 | 11/2013 |
| KR | 101580342 B1 | 12/2015 |
| KR | 20160028537 A | 3/2016 |
| KR | 101676591 B1 | 11/2016 |
| KR | 20170033902 A | 3/2017 |
| TW | 201145753 A | 12/2011 |
| TW | I482391 B | 4/2015 |
| TW | 201533561 A | 9/2015 |
| TW | I552483 B | 10/2016 |
| WO | 2014115193 A1 | 7/2014 |
| WO | 2016074458 A1 | 5/2016 |

OTHER PUBLICATIONS

Communication pursuant to Article 94(3) EPC issued in corresponding European application No. 17904556.2 dated May 4, 2020.
English translation of Notice of Reasons for Refusal issued in corresponding JP application No. 2019-514267 dated May 29, 2020.
First Examination Report issued in corresponding IN application No. 201917008151 dated Jun. 12, 2020.
Communication pursuant to Article 94(3) EPC issued in corresponding European application No. 17904431.8 dated Jun. 16, 2020.
Rejection issued in corresponding KR application No. 2019-7007549 dated Sep. 4, 2020.
Notice of Reasons for Refusal issued in corresponding JP application No. 2019-543900 dated Sep. 15, 2020.
Communication pursuant to Article 94(3) EPC issued in corresponding European application No. 17904556.2 dated Sep. 14, 2020.
Li J et al: "The effects of pulse charging on cycling characteristics of commercial lithium-ion batteries", dated Dec. 1, 2001.
Notice of Reasons for Refusal issued in corresponding JP application No. 2019-539764 dated Sep. 1, 2020.
Rejection issued in corresponding KR application No. 2019-7026966 dated Aug. 18, 2020.
Rejection issued in corresponding KR application No. 2019-7030041 dated Sep. 18, 2020.
First examination report issued in corresponding IN application No. 201917032693 dated Oct. 15, 2020.
Communication pursuant to Article 94(3) EPC issued in corresponding European application No. 18781860.4 dated Oct. 21, 2020.
European communication issued in corresponding European application No. 17904556.2 dated Dec. 4, 2019.
International search report issued in corresponding international application No. PCT/CN2018/076700 dated May 18, 2018.
Extended European search report issued in corresponding European application No. 18781860.4 dated Mar. 12, 2020.
English translation of The first office action issued in corresponding CN application No. CN201780041786.3 dated May 6, 2020.
English translation of The second office action issued in corresponding CN application No. CN201780041786.3 dated Jul. 10, 2020.
Extended European search report issued in corresponding European application No. 17905763.3 dated Jul. 15, 2019.
Communication pursuant to Article 94(3) EPC issued in corresponding European application No. 17905763.3 dated Jan. 15, 2020.
Communication pursuant to Article 94(3) EPC issued in corresponding European application No. 17905763.3 dated Jun. 4, 2020.
First Examination Report issued in corresponding IN application No. 201917000972 dated Mar. 2, 2020.
English translation of TW office action issued in corresponding TW application No. 107112719 dated Jan. 10, 2019.
International search report issued in corresponding international application No. PCT/CN2017/080334 dated Jan. 18, 2018.
Communication pursuant to Article 94(3) EPC issued in corresponding European application No. 17904556.2 dated Dec. 4, 2019.
The extended European search report issued in corresponding European application No. 17904431.8 dated Sep. 26, 2019.
English translation of Notification Letter of Review Opinions issued in corresponding TW application No. 107112166 dated Jan. 4, 2019.
The extended European search report issued in corresponding European application No. 17904556.2 dated Apr. 5, 2019.
International search report issued in corresponding international application No. PCT/CN2018/081963 dated Jul. 11, 2018.
International search report issued in corresponding international application No. PCT/CN2018/081962 dated Jun. 29, 2018.
English translation of Notice of Final Rejection issued in corresponding KR application No. 2019-7007549 dated Aug. 7, 2020.
English translation of Decision of Refusal issued in corresponding JP application No. 2019-514267 dated Aug. 7, 2020.
Examination Report issued in corresponding IN application No. 201917009580 dated Jul. 21, 2020.
International search report issued in corresponding international application No. PCT/2017/085990 dated Jan. 15, 2018.
International search report issued in corresponding international application No. PCT/2017/079784 dated Dec. 4, 2017.
Extended European search report issued in corresponding European application No. 17904431.8 dated Sep. 26, 2019.
Examination report issued in corresponding European application No. 17904431.8 dated Dec. 15, 2020.
Communication pursuant to Article 94(3) EPC issued in corresponding European application No. 18781860.4 dated Mar. 2, 2021.
Peter Keil et al: "Charging protocols for lithium-ion batteries and their impact on cycle life—An experimental study with different 18650 high-power cells", dated Mar. 29, 2016.
Communication pursuant to Article 94(3) EPC issued in corresponding European application No. 17904556.2 dated Jan. 19, 2021.
Notice of Allowance with English Translation issued in corresponding KR application No. 10-2019-7026966 dated Feb. 2, 2021.
Final rejection with English Translation issued in corresponding KR application No. 10-2019-7007549 dated Mar. 19, 2021.
Notice of allowance with English Translation issued in corresponding KR application No. 10-2019-7030041 dated Mar. 23, 2021.
Notice of Reasons with English Translation for Refusal issued in corresponding JP application No. 2019-539764 dated Apr. 2, 2021.
Non final rejection issued in corresponding U.S. Appl. No. 16/528,056 dated May 12, 2021.

(56) References Cited

OTHER PUBLICATIONS

Communication pursuant to Article 94(3) EPC for EP Application 17904431.8 dated Jun. 10, 2021. (4 pages).
Communication pursuant to Article 94(3) EPC for EP Application Application 17904556.2 dated Jul. 15, 2021. (4 pages).
Communication pursuant to Article 94(3) EPC for EP Application Application 18781860.4 dated Jun. 11, 2021. (6 pages).
Chinese First Office Action with English Transiation for CN Application 201780041668.2 dated Jul. 27, 2021. (52 pages).
Chinese First Office Action with English Translation for CN Application 201780017139.9 dated Aug. 23, 2021. (48 pages).
Communication pursuant to Article 94(3) EPC for EP Application 17904431.8 dated Nov. 10, 2021. (5 pages).
Communication pursuant to Article 94(3) EPC for EP Application 18781860.4 dated Sep. 15, 2021. (4 pages).
Korean Grant of Patent with English Translation for KR Application 1020197007549 dated Oct. 12, 2021. (7 pages).
Final Rejection for U.S. Appl. No. 16/528,056 dated Oct. 20, 2021. (37 pages).
Chinese Office Action with English Translation for CN Application 201910192398.6 dated Jan. 19, 2022. (35 pages).
Chinese Second Office Action with English Translation for CN Application 201780017139.9 dated Feb. 7, 2022. (40 pages).
Chinese Office Action with English Translation for CN Application 201780041668.2 dated Jan. 26, 2022. (25 pages).
Non-Final Office Action for U.S. Appl. No. 16/528,056 dated Feb. 3, 2022. (28 pages).
Communication pursuant to Article 94(3) EPC for EP Application 17904556.2 dated Jan. 13, 2022. (5 pages).

\* cited by examiner

THE DEVICE TO BE CHARGED CONDUCTS WIRELESS COMMUNICATION WITH THE WIRELESS CHARGING DEVICE ACCORDING TO THE OUTPUT VOLTAGE AND/OR THE OUTPUT CURRENT OF THE WIRELESS RECEPTION CIRCUIT DETECTED BY THE DETECTION CIRCUIT, WHEREBY THE WIRELESS CHARGING DEVICE ADJUSTS TRANSMISSION POWER OF THE WIRELESS TRANSMISSION CIRCUIT TO MAKE THE OUTPUT VOLTAGE AND/OR THE OUTPUT CURRENT OF THE WIRELESS RECEPTION CIRCUIT MATCH A PRESENT CHARGING STAGE OF THE BATTERY — 1010

FIG. 10

CONDUCT WIRELESS COMMUNICATION WITH THE DEVICE TO BE CHARGED DURING THE WIRELESS CHARGING, TO ADJUST TRANSMISSION POWER OF THE WIRELESS TRANSMISSION CIRCUIT, SO AS TO MAKE OUTPUT VOLTAGE AND/OR OUTPUT CURRENT OF A WIRELESS RECEPTION CIRCUIT OF THE DEVICE TO BE CHARGED MATCH A PRESENT CHARGING STAGE OF A BATTERY OF THE DEVICE TO BE CHARGED — 1110

FIG. 11

CONDUCT WIRELESS COMMUNICATION WITH THE WIRELESS CHARGING DEVICE ACCORDING TO THE OUTPUT VOLTAGE AND/OR THE OUTPUT CURRENT OF THE WIRELESS RECEPTION CIRCUIT DETECTED BY THE DETECTION CIRCUIT, TO ADJUST TRANSMISSION POWER OF THE WIRELESS CHARGING DEVICE TO MAKE THE OUTPUT VOLTAGE AND/OR THE OUTPUT CURRENT RECEIVED FROM THE WIRELESS RECEPTION CIRCUIT MATCH A PRESENT CHARGING STAGE OF THE BATTERY — 1210

FIG. 12

WIRELESS CHARGING DEVICE, WIRELESS CHARGING METHOD AND DEVICE TO BE CHARGED

CROSS-REFERENCE TO RELATED APPLICATION(S)

This application is a continuation of International Application No. PCT/CN2017/085990, filed on May 25, 2017, which claims priority to International Application No. PCT/CN2017/079784, filed on Apr. 7, 2017 and International Application No. PCT/CN2017/079786, filed on Apr. 7, 2017, the disclosures of all of which are hereby incorporated by reference in their entireties.

TECHNICAL FIELD

This disclosure relates to the field of wireless charging, and more particularly to a wireless charging device, a wireless charging method, and a device to be charged.

BACKGROUND

At present, in the technical field of charging, a device to be charged is charged mainly in a wired charging manner.

Taking mobile phones as an example, currently, the mobile phone is still charged mainly in the wired charging manner at present. Specifically, when the mobile phone needs to be charged, the mobile phone can be coupled with a power supply device via a charging cable such as a universal serial bus (USB) cable and output power of the power supply device can be transmitted to the mobile phone via the charging cable to charge a battery of the mobile phone.

As to the device to be charged, the wired charging manner needs to use the charging cable, which results in complicated operations in a charging preparation stage. Therefore, a wireless charging manner is enjoying increasing popularity among users. However, a conventional wireless charging method is poor in efficiency and thus needs to be improved.

SUMMARY

According to one aspect of the present disclosure, a wireless charging device is provided. The wireless charging device includes a wireless transmission circuit and a communication control circuit (corresponding to the first communication control circuit of the wireless charging system described in the first aspect of the present disclosure). The wireless transmission circuit is configured to transmit an electromagnetic signal to conduct wireless charging on a device to be charged. The communication control circuit is configured to conduct wireless communication with the device to be charged during the wireless charging to adjust transmission power of the wireless transmission circuit, to make at least one of output voltage and output current of a wireless reception circuit of the device to be charged match a present charging stage of a battery of the device to be charged.

According to another aspect of the present disclosure, a device to be charged is provided. The device to be charged includes a battery, a wireless reception circuit, a first charging channel, a detecting circuit, and a communication control circuit (corresponding to the second communication control circuit of the wireless charging system described in the first aspect of the present disclosure). The wireless reception circuit is configured to receive an electromagnetic signal from a wireless charging device and convert the electromagnetic signal into output voltage and output current of the wireless reception circuit. Through the first charging channel, the output voltage and the output current of the wireless reception circuit are received and provided to the battery for charging. The detecting circuit is configured to detect at least one of the output voltage and the output current of the wireless reception circuit. The communication control circuit is configured to conduct wireless communication with the wireless charging device according to at least one of the output voltage and the output current of the wireless reception circuit detected by the detecting circuit, whereby the wireless charging device adjusts transmission power thereof to make at least one of the output voltage and the output current of the wireless reception circuit match a present charging stage of the battery.

According another aspect of the present disclosure, a wireless charging method is provided. The wireless charging method includes conducting wireless communication with a device to be charged during wireless charging, to adjust transmission power of the wireless transmission circuit of a wireless charging device to make at least one of output voltage and output current of a wireless reception circuit of the device to be charged match a present charging stage of a battery of the device to be charged.

BRIEF DESCRIPTION OF DRAWINGS

FIG. 10 is a schematic flowchart illustrating a wireless charging method according to an implementation of the present disclosure.

FIG. 11 is a schematic flowchart illustrating a wireless charging method according to another implementation of the present disclosure.

FIG. 12 is a schematic flowchart illustrating a wireless charging method according to yet another implementation of the present disclosure.

DETAILED DESCRIPTION

According to implementations of the present disclosure, a device to be charged is charged based on wireless charging technology. It is unnecessary to use a cable to complete power transmission in the wireless charging technology, which can simplify operations in the charging preparation stage.

In conventional wireless charging technology, a power supply device (such as an adaptor) is coupled with a wireless charging device (such as a wireless charging base) and output power of the power supply device is transmitted to a device to be charged via the wireless charging device in a wireless manner (such as an electromagnetic signal or an electromagnetic wave) to conduct wireless charging on the device to be charged.

According to different wireless charging principles, the wireless charging manner mainly includes three types: magnetic coupling (or electromagnetic induction), magnetic resonance, and radio waves. At present, mainstream wireless charging standard includes QI standard, power matters alliance (PMA) standard, and alliance for wireless power (A4WP) standard. A magnetic coupling manner is adopted for wireless charging in the QI standard and in the PMA standard, and a magnetic resonance manner is adopted for wireless charging in the A4WP standard.

Figure 1:
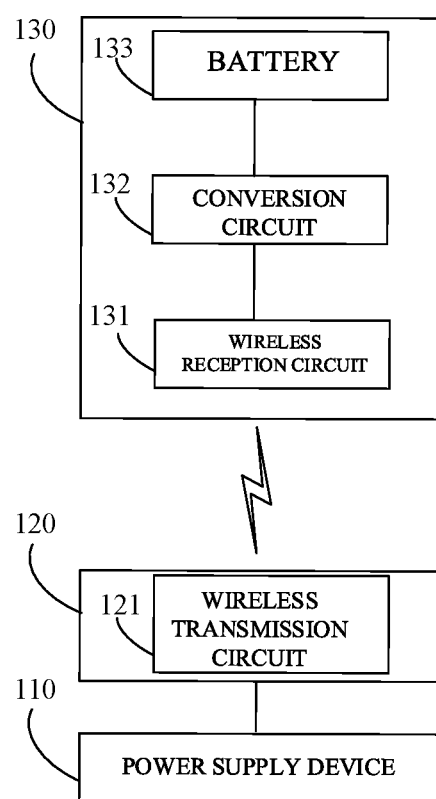
FIG. 1 is an exemplary structural diagram illustrating a conventional wireless charging system.

The following will introduce a conventional wireless charging manner in conjunction with FIG. 1.

As illustrated in FIG. 1, a wireless charging system includes a power supply device 110, a wireless charging device 120, and a device to be charged 130. The wireless charging device 120 can be, for example, a wireless charging base. The device to be charged 130 can be, for example, a terminal.

After the power supply device 110 is coupled with the wireless charging device 120, output current of the power supply device 110 can be transmitted to the wireless charging device 120. The wireless charging device 120 can be configured to convert the output current of the power supply device 110 into an electromagnetic signal (or an electromagnetic wave) via an internal wireless transmission circuit 121 for transmission. For example, the wireless transmission circuit 121 can be configured to convert the output current of the power supply device 110 into an alternating current (AC) and convert the AC into the electromagnetic signal via a transmitting coil or a transmitting antenna (not illustrated in FIG. 1).

The device to be charged 130 can be configured to receive the electromagnetic signal from the wireless transmission circuit 121 via a wireless reception circuit 131 and convert the electromagnetic signal into output current of the wireless reception circuit 131. For example, the wireless reception circuit 131 can be configured to convert the electromagnetic signal transmitted from the wireless transmission circuit 121 into an AC via a receiving coil or a receiving antenna (not illustrated in FIG. 1) and rectify and/or filter the AC to convert the AC into output voltage and output current of the wireless reception circuit 131.

As to the conventional wireless charging technology, before wireless charging begins, the wireless charging device 120 and the device to be charged 130 can be configured to negotiate transmission power of the wireless transmission circuit 121. When such power negotiated between the wireless charging device 120 and the device to be charged 130 is 5W (watt) for example, the output voltage and the output current of the wireless reception circuit 131 are respectively 5V (volt) and 1 A (ampere) in general. When the power negotiated between the wireless charging device 120 and the device to be charged 130 is 10.8 W for example, the output voltage and the output current of the wireless reception circuit 131 are respectively 9V and 1.2 A in general.

The output voltage of the wireless reception circuit 131 is however not suitable to be applied directly to a battery 133. Instead, it is required that the output voltage be converted by a conversion circuit 132 of the device to be charged 130 to obtain expected charging voltage and/or charging current of the battery 133 of the device to be charged 130.

The conversion circuit 132 can be configured to convert the output voltage of the wireless reception circuit 131 to meet requirements on the expected charging voltage and/or charging current of the battery 133.

As an implementation, the conversion circuit 132 can be a charging management module, such as a charging integrated circuit (IC). When the battery 133 is charged, the conversion circuit 132 is configured to manage the charging voltage and/or charging current of the battery 133. The conversion circuit 132 can include at least one of a voltage feedback function and a current feedback function to achieve management at least one of the charging voltage and charging current of the battery 133 respectively.

For example, a charging process of a battery can include at least one of a trickle charging stage, a constant-current charging stage, and a constant-voltage charging stage. In the trickle charging stage, the conversion circuit 132 can be configured to utilize the current feedback function to make current flowing into the battery 133 in the trickle charging stage satisfy the expected charging current of the battery 133 (such as a first charging current). In the constant-current charging stage, the conversion circuit 132 can be configured to utilize the current feedback function to make current flowing into the battery 133 in the constant-current charging stage satisfy the expected charging current of the battery 133 (such as a second charging current, which may be larger than the first charging current). In the constant-voltage charging stage, the conversion circuit 132 can be configured to utilize the voltage feedback function to make voltage applied to the battery 133 in the constant-voltage charging stage satisfy expected charging voltage of the battery 133.

As one implementation, when the output voltage of the wireless reception circuit 131 is higher than the expected charging voltage of the battery 133, the conversion circuit 132 can be configured to decrease (that is, step down) the output voltage of the wireless reception circuit 131 to make decreased charging voltage meet requirements on the expected charging voltage of the battery 133. As another implementation, when the output voltage of the wireless reception circuit 131 is lower than the expected charging voltage of the battery 133, the conversion circuit 132 can be configured to increase (that is, step up) the output voltage of the wireless reception circuit 131 to make increased charging voltage meet requirements on the expected charging voltage of the battery 133.

As yet another implementation, the output voltage of the wireless reception circuit 131 is a constant 5V voltage, for example. When the battery 133 includes a single cell (for example, a lithium battery cell, with a 4.2V charging cut-off voltage), the conversion circuit 132 (such as a Buck circuit) can be configured to decrease the output voltage of the wireless reception circuit 131 to make the decreased charging voltage meet requirements on the charging voltage of the battery 133.

As still another implementation, the output voltage of the wireless reception circuit 131 is a constant 5V voltage, for example. When the battery 133 includes two or more single-cells coupled in series (for example, a lithium battery cell, with a 4.2V charging cut-off voltage), the conversion circuit 132 (such as a Boost circuit) can be configured to increase the output voltage of the wireless reception circuit 131 to make the increased charging voltage meet requirements on the charging voltage of the battery 133.

The conversion circuit 132 is limited by low circuit conversion efficiency, which results in electrical energy that fails to be converted dissipating in the form of heat. The heat can be accumulated inside the device to be charged 130. Since designed space and heat dissipation space of the device to be charged 130 are both very small, for example, the physical size of a user's mobile terminal is increasingly lighter and thinner, and a large number of electronic components are densely arranged in the mobile terminal at the same time, difficulty in designing the conversion circuit 132 is increased. In addition, it is difficult to remove promptly heat accumulated inside the device to be charged 130, which in turn results in abnormality of the device to be charged 130.

For example, heat accumulated in the conversion circuit 132 may cause heat interference with electronic components near the conversion circuit 132, which results in working abnormality of the electronic components. For another example, the heat accumulated in the conversion circuit 132 may shorten service life of the conversion circuit 132 and the electronic components near the conversion circuit 132. For yet another example, the heat accumulated in the conversion circuit 132 may cause heat interference with the battery 133, which in turn brings about abnormality of charge and discharge of the battery 133. For still another example, the heat accumulated in the conversion circuit 132 may raise temperature of the device to be charged 130 and thus influence user experience in the charging process. For still another example, the heat accumulated in the conversion circuit 132 may result in short circuit of the conversion circuit 132 itself, as a result, the output voltage of the wireless reception circuit 131 is applied directly to the battery 133 and causes abnormality of charging. In case that the battery 133 is charged with overvoltage for a long time, explosion of the battery 133 may even occur, thus putting users at risk.

In order to solve the above problems, a wireless charging system is provided in one implementation of the disclosure. In the wireless charging system, a wireless charging device and a device to be charged can be configured to conduct wireless communication. In addition, transmission power of the wireless charging device can be adjusted according to feedback information of the device to be charged to make output voltage and/or output current of a wireless reception circuit of the device to be charged match a present charging stage of a battery. That is to say, in the wireless charging system, the wireless charging device and the device to be charged can be configured to conduct wireless communication, and the transmission power of the wireless charging device can be adjusted according to the feedback information of the device to be charged to make the output voltage and/or output current of the wireless reception circuit of the device to be charged satisfy present requirements on charging of the battery (including present requirements on charging voltage and/or charging current of the battery). In this way, in the device to be charged, the output voltage and/or output current of the wireless reception circuit can be applied directly to the battery for charging (referred to as "direct charging" hereinafter), which can avoid problems such as energy loss, heating, etc. resulting from the conversion circuit converting the output voltage and/or output current of the wireless reception circuit described above.

Figure 2:
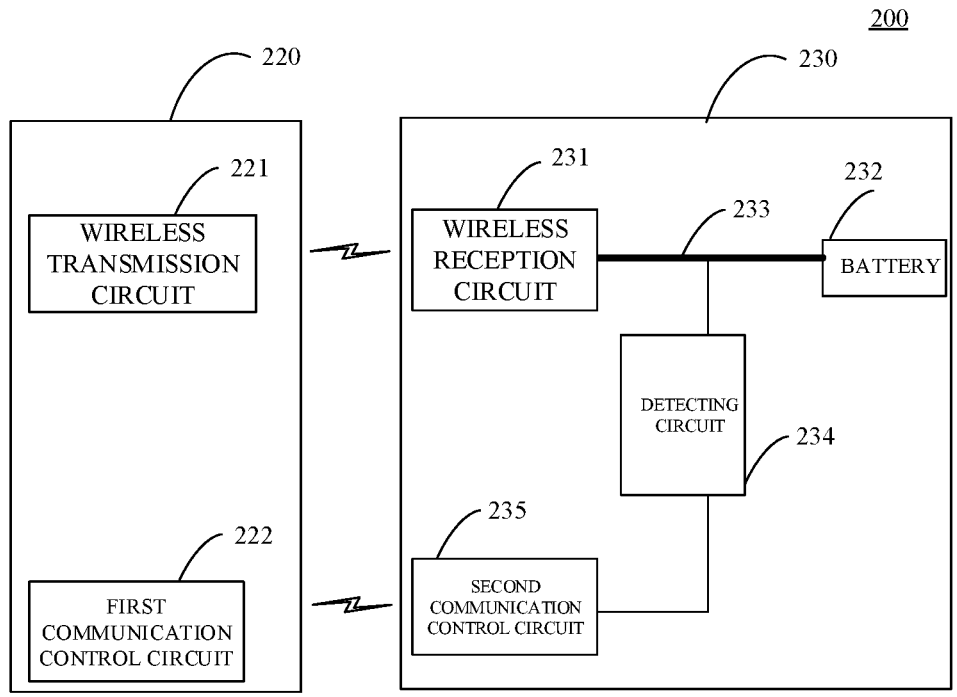
FIG. 2 is a schematic structural diagram illustrating a wireless charging system according to an implementation of the present disclosure.

The following will describe in detail a wireless charging system 200 according to an implementation of the disclosure in conjunction with FIG. 2.

As illustrated in FIG. 2, the wireless charging system 200 in the implementation of the disclosure can include a wireless charging device 220 and a device to be charged 230.

The wireless charging device 220 can include a wireless transmission circuit 221 and a first communication control circuit 222. Control function of the first communication control circuit 222 can be achieved by, for instance, a micro control unit (MCU).

The wireless transmission circuit 221 can be configured to transmit an electromagnetic signal to conduct wireless charging on the device to be charged 230. In some implementations, the wireless transmission circuit 221 can include a wireless transmission driving circuit and a transmitting coil or a transmitting antenna (not illustrated in FIG. 2). The wireless transmission driving circuit can be configured to generate an AC of high frequency. The transmitting coil or the transmitting antenna can be configured to convert the AC of high frequency into the electromagnetic signal for transmission.

The first communication control circuit 222 can be configured to conduct wireless communication with the device to be charged 230 during wireless charging. Specifically, the first communication control circuit 222 can be configured to communicate with a second communication control circuit 235 of the device to be charged 230. The manner of communication between the first communication control circuit 222 and the second communication control circuit 235 and the communication information transmitted between the first communication control circuit 222 and the second communication control circuit 235 are not limited herein, which will be described in detail hereinafter in conjunction with specific implementations.

The device to be charged 230 can include a wireless reception circuit 231, a battery 232, a first charging channel 233, a detecting circuit 234, and the second communication control circuit 235. Control function of the second communication control circuit 235 can be embodied by, for instance, an MCU, or be cooperatively achieved by the MCU and an application processor (AP) of the device to be charged.

The wireless reception circuit 231 can be configured to receive the electromagnetic signal and convert the electromagnetic signal into output voltage and output current of the wireless reception circuit 231. Specifically, the wireless reception circuit 231 can include a receiving coil or a receiving antenna (not illustrated in FIG. 2) and a shaping circuit (such as a rectifying circuit and/or a filtering circuit) coupled with the receiving coil and the receiving antenna. The receiving antenna or the receiving coil can be configured to convert the electromagnetic signal into an AC. The shaping circuit can be configured to convert the AC into the output voltage and the output current of the wireless reception circuit 231. It should be noted that, the configuration of the shaping circuit and the form of the output voltage and the output current of the wireless reception circuit 231 obtained after processing of the shaping circuit are not limited herein. In some implementations, the shaping circuit can include the rectifying circuit and the filtering circuit. The output voltage of the wireless reception circuit 231 can be a steady voltage obtained after filtering. In another implementation, the shaping circuit can include the rectifying circuit. The output voltage of the wireless reception circuit 231 can be a pulsating waveform voltage obtained after rectification. The pulsating waveform voltage can be applied directly to the battery 232 of the device to be charged 230 to charge the battery 232. It can be understood that, the output current of the wireless reception circuit 231 can be used for charging the battery 232 in an intermittent manner. Period of the output current of the wireless reception circuit 231 can vary with frequency of an AC input into the wireless charging system 200 such as an AC power grid. For instance, frequency corresponding to the period of the output current of the wireless reception circuit 231 is N times (N is a positive integer) or N times the reciprocal of frequency of a power grid. In addition, when the output current of the wireless reception circuit 231 is used for charging the battery 232 in an intermittent manner, current waveform corresponding to the output current of the wireless reception circuit 231 can include one pulse or one group of pulses synchronized with the power grid. Compared with a conventional constant direct current (DC), such pulsating voltage or pulsating current whose magnitude varies periodically can reduce lithium precipitation of a lithium battery and increase service life of a battery. In addition, the pulsating voltage or pulsating current is beneficial to reducing polarization effect of the battery, improving charging speed, and reducing heating of the battery, thereby ensuring safety and reliability in charging of the device to be charged.

Through the first charging channel 233, the output voltage and the output current of the wireless reception circuit 231 can be received and provided to the battery 232 for charging. Through the first charging channel 233, direct charging can be conducted on the battery 232 according to the output voltage and the output current of the wireless reception circuit 231. For instance, the first charging channel 233 can be a wire. For another instance, in case that the device to be charged 230 includes multiple charging channels, the first charging channel 233 can be provided with components such as a switch (refer to a switch 238 illustrated in FIG. 6) which is configured for switching between different charging channels.

The detecting circuit 234 can be configured to detect the output voltage and/or the output current of the wireless reception circuit 231. In some implementations, the detecting circuit 234 can include a voltage detecting circuit and a current detecting circuit.

The voltage detecting circuit can be configured to sample the output voltage of the wireless reception circuit 231 and transmit sampled voltage value to the second communication control circuit 235. In some implementations, the voltage detecting circuit can be configured to sample the output voltage of the wireless reception circuit 231 in a series-voltage division manner.

The current detecting circuit can be configured to sample the output current of the wireless reception circuit 231 and transmit sampled current value to the second communication control circuit 235. In some implementations, the current detecting circuit can be configured to sample the output current of the wireless reception circuit 231 via a current detection resistor and a current detector.

The second communication control circuit 235 can be configured to conduct wireless communication with the first communication control circuit 222 according to the output voltage and/or the output current of the wireless reception circuit 231 detected by the detecting circuit 234, whereby the first communication control circuit 222 adjusts transmission power of the wireless transmission circuit 221 to make the output voltage and/or the output current of the wireless reception circuit 231 match a present charging stage of the battery 232.

In other words, the second communication control circuit 235 can be configured to conduct wireless communication with the first communication control circuit 222 according to the output voltage and/or the output current of the wireless reception circuit 231 detected by the detecting circuit 234, whereby the first communication control circuit 222 adjusts the transmission power of the wireless transmission circuit 221 to make the output voltage and/or the output current of the wireless reception circuit 231 satisfy requirements on charging of the battery 232 (including requirements on charging voltage and/or charging current of the battery 232).

That is to say, the second communication control circuit 235 can be configured to conduct wireless communication with the first communication control circuit 222 according to the output voltage and/or the output current of the wireless reception circuit 231 detected by the detecting circuit 234, whereby the first communication control circuit 222 adjusts the transmission power of the wireless transmission circuit 221 to make the output voltage and/or the output current of the wireless reception circuit 231 satisfy requirements on charging of the battery 232 in at least one of a trickle charging stage, a constant-voltage charging stage, and a constant-current charging stage.

In other words, the second communication control circuit 235 can be configured to conduct wireless communication with the first communication control circuit 222 according to the output voltage and/or the output current of the wireless reception circuit 231 detected by the detecting circuit 234, whereby the first communication control circuit 222 conducts constant-voltage control and/or constant-current control on a charging process of the battery 232 by adjusting the transmission power of the wireless transmission circuit 221.

The charging process of the battery can include at least one of the trickle charging stage, the constant-voltage charging stage, and the constant-current charging stage.

The second communication control circuit 235 configured to conduct wireless communication with the first communication control circuit 222 according to the output voltage and/or the output current of the wireless reception circuit 231 detected by the detecting circuit 234, whereby the first communication control circuit 222 adjusts the transmission power of the wireless transmission circuit 221 according to the output voltage and/or the output current of the wireless reception circuit 231 can be configured to, in the trickle charging stage of the battery 232, conduct the wireless communication with the first communication control circuit 222 according to the output voltage and/or the output current of the wireless reception circuit 231 detected by the detecting circuit 234, whereby the first communication control circuit 222 adjusts the transmission power of the wireless transmission circuit 221 to make the output current of the wireless reception circuit 231 match charging current corresponding to the trickle charging stage (or to make the output current of the wireless reception circuit 231 satisfy requirements on charging current of the battery 232 in the trickle charging stage).

For example, the charging current corresponding to the trickle charging stage is 1A. When the battery 232 is in the trickle charging stage, the output current of the wireless reception circuit 231 can be detected in real time by the detecting circuit 234. When the output current of the wireless reception circuit 231 is larger than 1A, the second communication control circuit 235 can be configured to communicate with the first communication control circuit 222, whereby the first communication control circuit 222 adjusts the transmission power of the wireless transmission circuit 221 to make the output current of the wireless reception circuit 231 return to 1A.

The second communication control circuit 235 configured to conduct the wireless communication with the first communication control circuit 222 according to the output voltage and/or the output current of the wireless reception circuit 231 detected by the detecting circuit 234, whereby the first communication control circuit 222 adjusts the transmission power of the wireless transmission circuit 221 according to the output voltage and/or the output current of the wireless reception circuit 231 can be configured to, in the constant-voltage charging stage of the battery 232, conduct the wireless communication with the first communication control circuit 222 according to the output voltage and/or the output current of the wireless reception circuit 231 detected by the detecting circuit 234, whereby the first communication control circuit 222 adjusts the transmission power of the wireless transmission circuit 221 to make the output voltage of the wireless reception circuit 231 match charging voltage corresponding to the constant-voltage charging stage (or to make the output voltage of the wireless reception circuit 231 satisfy requirements on charging voltage of the battery 232 in the constant-voltage charging stage).

For example, the charging voltage corresponding to the constant-voltage charging stage is 5V. When the battery 232 is in the constant-voltage charging stage, the output voltage of the wireless reception circuit 231 can be detected in real time by the detecting circuit 234. When the output voltage of the wireless reception circuit 231 is lower than 5V, the second communication control circuit 235 can be configured to communicate with the first communication control circuit 222, whereby the first communication control circuit 222 adjusts the transmission power of the wireless transmission circuit 221 to make the output voltage of the wireless reception circuit 231 return to 5V. The reason for which the output voltage of the wireless reception circuit 231 varies may be various and is not limited herein. For instance, transmission of the electromagnetic signal between the wireless transmission circuit 221 and the wireless reception circuit 231 is disturbed, which results in reduction in energy-conversion efficiency, thereby causing the output voltage of the wireless reception circuit 231 being lower than 5V.

The second communication control circuit 235 configured to conduct the wireless communication with the first communication control circuit 222 according to the output voltage and/or the output current of the wireless reception circuit 231 detected by the detecting circuit 234 whereby the first communication control circuit 222 adjusts the transmission power of the wireless transmission circuit 221 according to the output voltage and/or the output current of the wireless reception circuit 231 can be configured to, in the constant-current charging stage of the battery 232, conduct the wireless communication with the first communication control circuit 222 according to the output voltage and/or the output current of the wireless reception circuit 231 detected by the detecting circuit 234, whereby the first communication control circuit 222 adjusts the transmission power of the wireless transmission circuit 221 to make the output current of the wireless reception circuit 231 match charging current corresponding to the constant-current charging stage (or to make the output current of the wireless reception circuit 231 satisfy requirements on charging current of the battery 232 in the constant-current charging stage).

For example, the charging current corresponding to the constant-current charging stage is 2A. When the battery 232 is in the constant-current charging stage, the output current of the wireless reception circuit 231 can be detected in real time by the detecting circuit 234. When the output current of the wireless reception circuit 231 is smaller than 2A, the second communication control circuit 235 can be configured to communicate with the first communication control circuit 222, whereby the first communication control circuit 222 adjusts the transmission power of the wireless transmission circuit 221 to make the output current of the wireless reception circuit 231 return to 2A. The reason for which the output current of the wireless reception circuit 231 varies may be various and is not limited herein. For instance, transmission of the electromagnetic signal between the wireless transmission circuit 221 and the wireless reception circuit 231 is disturbed, which results in reduction in energy-conversion efficiency, thereby causing the output current of the wireless reception circuit 231 being smaller than 2A.

It should be noted that, the constant-current charging stage or the constant-current stage referred to herein does not require that the charging current remain completely constant, and may be, for example, a peak value (that is, peak current) or an average value of the charging current remaining constant within a certain time period. Practically, in the constant-current charging stage, a multi-stage constant current charging manner is usually adopted for charging.

Multi-stage constant current charging can include N constant-current stages, where N is an integer not less than two (N>=2). In the multi-stage constant current charging, a first stage of charging begins with a pre-determined charging current. The N constant-current stages of the multi-stage constant current charging are executed in sequence from the first stage to the $N^{th}$ stage. When a previous constant-current stage ends and a next constant-current stage begins, the peak value or average value of a pulsating waveform current may decrease. When voltage of the battery reaches a threshold of charging cut-off voltage, the multi-stage constant current charging proceeds to a subsequent constant-current stage, that is, the previous constant-current stage ends and the next constant-current stage begins. Current conversion between two adjacent constant-current stages may be gradual or in a step-like manner.

In the implementations of the present disclosure, the device to be charged can be a terminal. The "terminal" can include but is not limited to a device coupled via a wired line and/or a wireless interface to receive/transmit communication signals. Examples of the wired line may include, but are not limited to, at least one of a public switched telephone network (PSTN), a digital subscriber line (DSL), a digital cable, a direct connection cable, and/or other data connection lines or network connection lines. Examples of the wireless interface may include, but are not limited to, a wireless interface with a cellular network, a wireless local area network (WLAN), a digital television network (such as a digital video broadcasting-handheld (DVB-H) network), a satellite network, an amplitude modulation-frequency modulation (AM-FM) broadcast transmitter, and/or with other communication terminals. A communication terminal configured to communicate via a wireless interface may be called a "wireless communication terminal", a "wireless terminal", and/or a "mobile terminal". Examples of a mobile terminal may include, but are not limited to, a satellite or cellular telephone, a personal communication system (PCS) terminal capable of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and a conventional laptop or a handheld receiver or other electronic devices equipped with radio telephone transceiver. In addition, in the implementations of the present disclosure, the device to be charged or terminal can also include a power bank. The power bank can be configured to be charged by an adaptor and thus store energy to charge other electronic devices.

The communication manner and the communication order between the wireless charging device 220 and the device to be charged 230 are not limited herein.

Optionally, in some implementations, wireless communication between the wireless charging device 220 and the device to be charged 230 (or between the second communication control circuit 235 and the first communication control circuit 222) can be one-way wireless communication. For example, during wireless charging of the battery 232, it can be specified that the device to be charged 230 is an initiator of communication and the wireless charging device 220 is a receiver of communication. Exemplarily, in the constant-current charging stage of the battery, the device to be charged 230 can be configured to detect in real time the charging current of the battery 232 (that is, the output current of the wireless reception circuit 231) through the detecting circuit 234. When the charging current of the battery 232 does not match the present charging stage of the battery, the device to be charged 230 can be configured to send adjustment information to the wireless charging device 220 to instruct the wireless charging device 220 to adjust the transmission power of the wireless transmission circuit 221.

Alternatively, in some implementations, wireless communication between the wireless charging device 220 and the device to be charged 230 (or between the second communication control circuit 235 and the first communication control circuit 222) can be two-way wireless communication. The two-way wireless communication generally requires that the receiver send response information to the initiator after receiving communication request initiated by the initiator. Two-way communication mechanism can make a communication process safer.

Description above does not limit master-slave relationship between the wireless charging device 220 (the first communication control circuit 222 of the wireless charging device 220) and the device to be charged 230 (or the second communication control circuit 235 of the device to be charged 230). That is to say, any one of the wireless charging device 220 and the device to be charged 230 can function as a master device to initiate two-way communication, and correspondingly the other one of the wireless charging device 220 and the device to be charged 230 can function as a slave device to make a first response or a first reply to the communication initiated by the master device. As a practical manner, the master device and the slave device can be determined by comparing link states of the wireless charging device 220 and the device to be charged 230. For example, suppose a wireless link in which the wireless charging device 220 sends information to the device to be charged 230 is an uplink and a wireless link in which the device to be charged 230 sends information to the wireless charging device 220 is a downlink. When the uplink is of higher quality, the wireless charging device 220 can function as the master device of communication. When the downlink is of higher quality, the device to be charged 230 can function as the master device of communication.

The manner in which the two-way communication between the wireless charging device 220 and the device to be charged 230 is implemented is not limited herein. That is to say, any one of the wireless charging device 220 and the device to be charged 230 can function as the master device to initiate the two-way communication, and correspondingly the other one of the wireless charging device 220 and the device to be charged 230 can function as the slave device to make the first response or the first reply to the communication initiated by the master device. Besides, the master device can make a second response to the first response or the first reply of the slave device, as such, the master device and the slave device complete a negotiation.

The master device can make the second response to the first response or the first reply of the slave device as follows. The master device receives from the slave device the first response or the first reply to the communication and make the second response to the first response or the first reply of the slave device.

The master device can also make the second response to the first response or the first reply of the slave device as follows. When the master device fails to receive from the slave device the first response or the first reply to the communication within a preset time period, the master device can still make the second response.

Alternatively, in some implementations, after the device to be charged 230, as the master device, initiates the communication and the wireless charging device 220, as the slave device, makes the first response or the first reply to the communication initiated by the master device, the master device and the slave device can complete a negotiation without the device to be charged 230 making the second response to the first response or the first reply of the wireless charging device 220.

The manner of wireless communication between the first communication control circuit 222 of the wireless charging device 220 and the second communication control circuit 235 of the device to be charged 230 is not limited herein. For instance, the first communication control circuit 222 and the second communication control circuit 235 can conduct wireless communicate with each other based on Bluetooth®, wireless fidelity (Wi-Fi), or backscatter modulation (or power load modulation).

As pointed above, during the wireless charging, the second communication control circuit 235 can be configured to conduct the wireless communication with the first communication control circuit 222 according to the output voltage and/or the output current of the wireless reception circuit 231 detected by the detecting circuit 234, whereby the first communication control circuit 222 adjusts the transmission power of the wireless transmission circuit 221. However, communication content transmitted between the first communication control circuit 222 and the second communication control circuit 235 is not limited herein.

As an implementation, the second communication control circuit 235 can be configured to send the output voltage and/or the output current of the wireless reception circuit 231 detected by the detecting circuit 234 to the first communication control circuit 222. In addition, the second communication control circuit 235 can be further configured to send state information of the battery to the first communication control circuit 222. The state information of the battery is indicative of present power and/or present voltage of the battery 232 of the device to be charged 230. The first communication control circuit 222 can be configured to determine the present charging stage of the battery 232 according to the state information of the battery 232, to further determine target charging voltage and/or target charging current that match the present charging stage of the battery 232. Then the first communication control circuit 222 can be configured to compare the output voltage and/or the output current of the wireless reception circuit 231 received from the second communication control circuit 235 with the above target charging voltage and/or target charging current to determine whether the output voltage and/or the output current of the wireless reception circuit 231 matches the present charging stage of the battery 232. When the output voltage and/or the output current of the wireless reception circuit 231 does not match the present charging stage of the battery 232, the first communication control circuit 222 can be configured to adjust the transmission power of the wireless transmission circuit 221 until the output voltage and/or the output current of the wireless reception circuit 231 matches the present charging stage of the battery 232.

As another implementation, the second communication control circuit 235 can be configured to send adjustment information to the first communication control circuit 222 to instruct the first communication control circuit 222 to adjust the transmission power of the wireless transmission circuit 221. For example, the second communication control circuit 235 can be configured to instruct the first communication control circuit 222 to increase the transmission power of the wireless transmission circuit 221. For another example, the second communication control circuit 235 can be configured to instruct the first communication control circuit 222 to reduce the transmission power of the wireless transmission circuit 221. Specifically, the wireless charging device 220 can be configured to provide the wireless transmission circuit 221 with multiple grades of the transmission power. Each time the first communication control circuit 222 receives the adjustment information, the first communication control circuit 222 is configured to adjust the transmission power of the wireless transmission circuit 221 by one grade until the output voltage and/or the output current of the wireless reception circuit 231 matches the present charging stage of the battery 232.

Besides the above communication content, the first communication control circuit 222 and the second communication control circuit 235 can also be configured to exchange other types of communication information. In some implementations, the first communication control circuit 222 and the second communication control circuit 235 can be configured to exchange information for safety protection, abnormality detection, or fault handling, such as temperature information of the battery 232, information indicative of over-voltage protection or over-current protection, etc., or power-transmission efficiency information (for indicating efficiency in power transmission between the wireless transmission circuit 221 and the wireless reception circuit 231).

For example, when the temperature of the battery 232 is excessively high, the first communication control circuit 222 and/or the second communication control circuit 235 can be configured to control a charging loop to a protection state, such as controlling the charging loop to stop the wireless charging. For another example, after receiving the information indicative of over-voltage protection or over-current protection from the second communication control circuit 235, the first communication control circuit 222 can be configured to reduce the transmission power, or control the wireless transmission circuit 221 to stop working. For yet another example, after receiving the power-transmission efficiency information from the second communication control circuit 235, the first communication control circuit 222 can be configured to control the wireless transmission circuit 221 to stop working when power-transmission efficiency is lower than a preset threshold and notify user of the event. Exemplarily, the power-transmission efficiency being excessively low can be displayed via a display screen, or be indicated by an indicator light in order for the user to adjust wireless charging environment.

In some implementations, the first communication control circuit 222 and the second communication control circuit 235 can be configured to transmit other types of communication information for adjusting the transmission power of the wireless transmission circuit 221, such as the temperature information of the battery 232, information indicative of a peak value or an average value of the output voltage of the wireless reception circuit 231, information indicative of a peak value or an average value of the output current of the wireless reception circuit 231, the power-transmission efficiency information (for indicating efficiency in power transmission between the wireless transmission circuit 221 and the wireless reception circuit 231), etc.

For instance, the second communication control circuit 235 can be configured to send the power-transmission efficiency information to the first communication control circuit 222. The first communication control circuit 222 can be further configured to determine adjustment range of the transmission power of the wireless transmission circuit 221 according to the power-transmission efficiency information. Specifically, when the power-transmission efficiency information indicates that the efficiency in power transmission between the wireless transmission circuit 221 and the wireless reception circuit 231 is low, the first communication control circuit 222 can increase the adjustment range of the transmission power of the wireless transmission circuit 221 to make the transmission power of the wireless transmission circuit 221 reach promptly a target power.

For another instance, when the output voltage and/or the output current of the wireless reception circuit 231 is a pulsating waveform voltage and/or a pulsating waveform current, the second communication control circuit 235 can be configured to send at least one of the information indicative of a peak value or an average value of the output voltage of the wireless reception circuit 231 and the information indicative of a peak value or an average value of the output current of the wireless reception circuit 231 to the first communication control circuit 222. The first communication control circuit 222 can be configured to determine whether the peak value or the average value of the output voltage and/or the output current of the wireless reception circuit 231 matches the present charging stage of the battery. When the peak value or the average value of the output voltage and/or the output current of the wireless reception circuit 231 does not match the present charging stage of the battery, the first communication control circuit 222 is configured to adjust the transmission power of the wireless transmission circuit 221.

For yet another instance, the second communication control circuit 235 can be configured to send the temperature information of the battery 232 to the first communication control circuit 222. When temperature of the battery 232 is excessively high, the first communication control circuit 222 is configured to reduce the transmission power of the wireless transmission circuit 221 to decrease the output current of the wireless reception circuit 231, thereby reducing the temperature of the battery 232.

Figure 3:
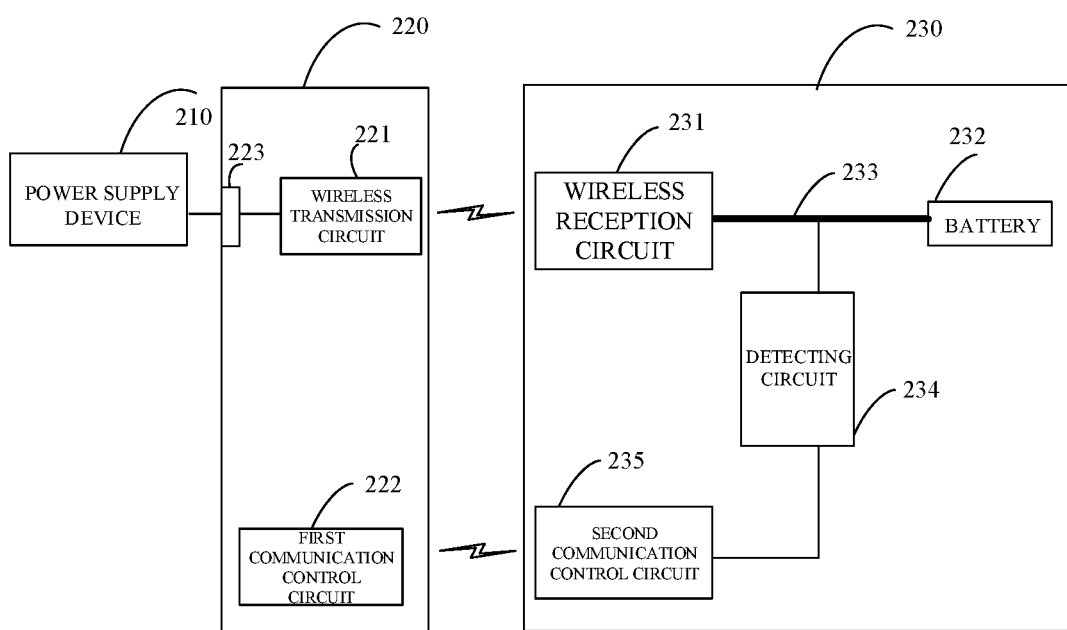
FIG. 3 is a schematic structural diagram illustrating a wireless charging system according to another implementation of the present disclosure.

As illustrated in FIG. 3, the wireless charging device 220 in implementations of the disclosure can further include a charging interface 223. The wireless transmission circuit 221 can be further configured to receive output voltage and output current from a power supply device 210 via the charging interface 223 and generate an electromagnetic signal according to the output voltage and the output current of the power supply device 210.

The type of the power supply device 210 is not limited herein. For example, the power supply device 210 can be an adaptor, a power bank, a computer, etc.

The type of the charging interface 223 is not limited herein. Optionally, in some implementations, the charging interface 223 can be a USB interface. The USB interface can be, for example, a USB 2.0 interface, a micro USB interface, or a USB TYPE-C interface. Alternatively, in other implementations, the charging interface 223 can also be a lightning interface, or other types of parallel interface and/or serial interface for charging.

The manner of communication between the first communication control circuit 222 and the power supply device 210 is no limited herein. As an implementation, the first communication control circuit 222 can be configured to be coupled with and communicate with the power supply device 210 via another communication interface except the charging interface. As another implementation, the first communication control circuit 222 can be configured to communicate with the power supply device 210 in a wireless manner. For example, the first communication control circuit 222 can be configured to conduct near field communication (NFC) with the power supply device 210. As yet another implementation, the first communication control circuit 222 can be configured to communicate with the power supply device 210 via the charging interface 223 without providing an extra communication interface or another wireless communication module, which can simplify the implementation of the wireless charging device 220. For instance, the charging interface 223 is a USB interface. The first communication control circuit 222 can be configured to communicate with the power supply device 210 via a data line (such as a D+line and/or a D−line) of the USB interface. For another instance, the charging interface 223 is a USB interface supporting a power delivery (PD) communication protocol (such as the USB TYPE-C interface). The first communication control circuit 222 can be configured to communicate with the power supply device 210 based on the PD communication protocol.

It should be understood that, the power supply device 210 can be a conventional power supply device with a constant output power, or a power supply device with adjustable output power provided herein. The power supply device with adjustable output power can be provided with a voltage feedback loop and a current feedback loop inside to adjust the output voltage and/or the output power of the power supply device according to actual needs (described in detail hereinafter in conjunction with an example of the power supply device 210 with adjustable output power). In addition, the power supply device 210 can also have a communication function. The first communication control circuit 222 can be further configured to communicate with the power supply device 210 to negotiate output power of the power supply device 210.

As pointed above, the wireless charging device 220 in implementations of the disclosure can be configured to adjust continuously the transmission power of the wireless transmission circuit 221 during charging to make the output voltage and/or the output current of the wireless reception circuit 231 match the present charging stage of the battery 232. The manner in which the transmission power of the wireless transmission circuit 221 is adjusted is not limited herein. For example, the first communication control circuit 222 can be configured to communicate with the power supply device 210 to adjust the output voltage and/or the output current of the power supply device 210, so as to adjust the transmission power of the wireless transmission circuit 221. For another example, the first communication control circuit 222 can be configured to adjust amount of power extracted by the wireless transmission circuit 221 from a maximum output power of the power supply device 210 to adjust the transmission power of the wireless transmission circuit 221. The following will describe in detail the manner in which the transmission power of the wireless transmission circuit 221 is adjusted in conjunction with FIG. 4 and FIG. 5.

Figure 4:
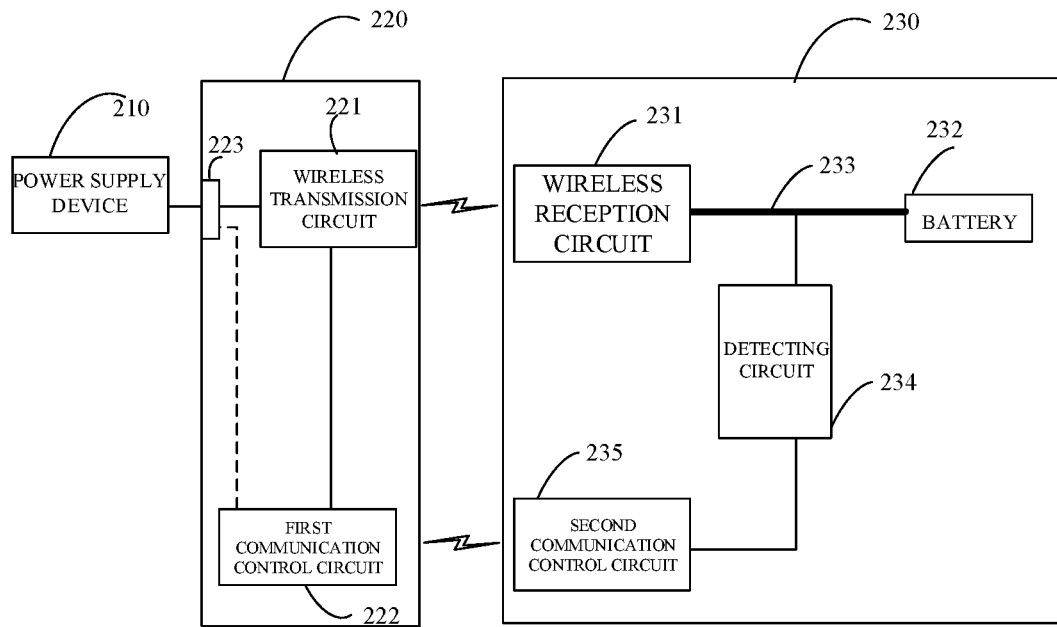
FIG. 4 is a schematic structural diagram illustrating a wireless charging system according to yet another implementation of the present disclosure.

As illustrated in FIG. 4, optionally, as one implementation, the first communication control circuit 222 can be configured to communicate with the power supply device 210 to negotiate the maximum output power of the power supply device 210. The first communication control circuit 222 can be configured to adjust the amount of power extracted by the wireless transmission circuit 221 from the maximum output power of the power supply device 210 to adjust the transmission power of the wireless transmission circuit 221, when the wireless transmission circuit 221 conducts wireless charging on the device to be charged 230 according to the maximum output power.

In the implementation of the disclosure, the first communication control circuit 222 is configured to communicate with the power supply device 210 with adjustable output power to negotiate the maximum output power of the power supply device 210. After negotiation is completed, the power supply device 210 can be configured to provide the output voltage and the output current for the wireless charging device 220 according to the maximum output power. The first communication control circuit 222 can be configured to extract a certain amount of power from the maximum output power during charging for wireless charging according to actual needs. In other words, according to the implementation of the disclosure, control of adjusting the transmission power of the wireless transmission circuit 221 is allotted to the first communication control circuit 222. The first communication control circuit 222 can be configured to adjust the transmission power of the wireless transmission circuit 221 soon after receiving feedback information from the device to be charged 230, which has advantages of high adjusting speed and high efficiency.

The manner in which the first communication control circuit 222 adjusts the transmission power of the wireless transmission circuit 221 is not limited herein. For example, a power adjustment circuit can be disposed inside the first communication control circuit 222, inside the wireless transmission circuit 221, or between the first communication control circuit 222 and the wireless transmission circuit 221. The power adjustment circuit can be configured to be coupled with the transmission coil or the transmission antenna to adjust power received by the transmission coil or the transmission antenna. The power adjustment circuit can include, for example, a pulse width modulation (PWM) controller and a switch component. The first communication control circuit 222 can be configured to adjust the transmission power of the wireless transmission circuit 221 by adjusting duty cycle of a control signal transmitted from the PWM controller and/or by controlling switch frequency of the switch component.

It should be noted that, optionally, in the implementation illustrated in FIG. 4, the power supply device 210 can also be a power supply device with a constant and high output power (such as 40W). In this way, the first communication control circuit 222 can be configured to adjust directly amount of power extracted by the wireless transmission circuit 221 from such constant output power of the power supply device 210 without negotiating with the power supply device 210 the maximum output power of the power supply device 210.

Figure 5:
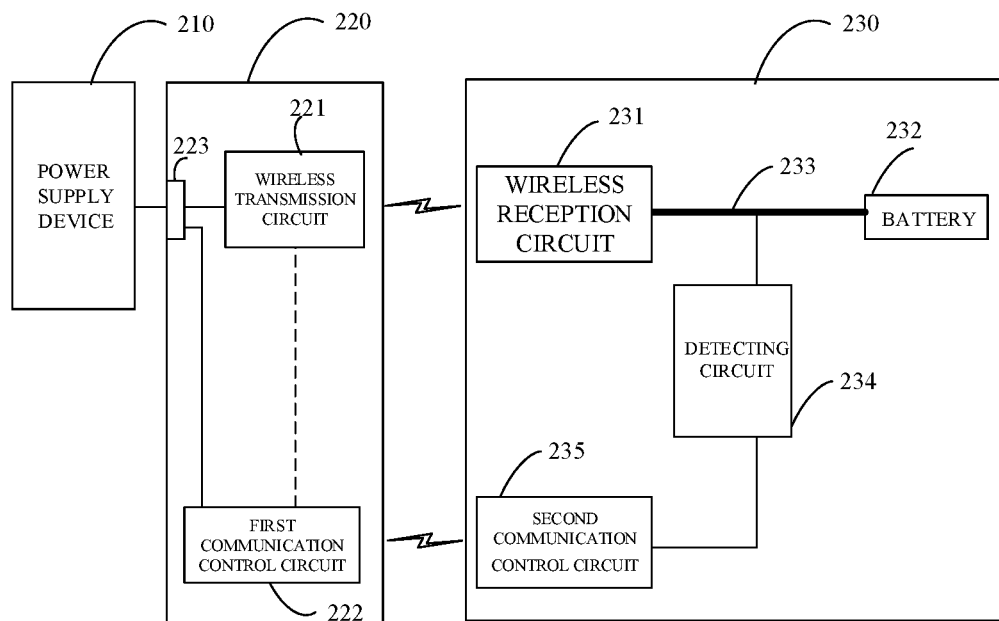
FIG. 5 is a schematic structural diagram illustrating a wireless charging system according to still another implementation of the present disclosure.

As illustrated in FIG. 5, optionally, in another implementation, the first communication control circuit 222 can be configured to communicate with the power supply device 210 to adjust the output voltage and/or the output current of the power supply device 210 to adjust the transmission power of the wireless transmission circuit 221. In addition, in some implementations, the first communication control circuit 222 can be configured to be coupled with the wireless transmission circuit 221 to control the wireless transmission circuit 221 to work. Optionally, the first communication control circuit 222 can be configured to control the wireless transmission circuit 221 to stop working when the wireless charging is abnormal. Alternatively, in some implementations, the first communication control circuit 222 is not coupled with the wireless transmission circuit 221.

Different from the implementation illustrated in FIG. 4, in the implementation illustrated in FIG. 5, the control of adjusting the transmission power of the wireless transmission circuit 221 is allotted to the power supply device 210, and the power supply device 210 is configured to adjust the transmission power of the wireless transmission circuit 221 by changing the output voltage and/or output current. In such an adjusting manner, the power supply device 210 can provide the exact amount of power required by the wireless charging device 220, and there is no waste of power.

In the implementation illustrated in FIG. 5, the wireless charging device 220 can be configured to determine actively whether it is necessary to adjust the output voltage and/or the output current of the power supply device 210. In another implementation, the wireless charging device 220 can function as a bridge of communication between the power supply device 210 and the device to be charged 230 and be configured to forward information between the power supply device 210 and the device to be charged 230.

For example, the first communication control circuit 222 can be configured to communicate with the device to be charged 230 during the wireless charging to determine whether it is necessary to adjust the output voltage and/or the output current of the power supply device 210. When it is necessary to adjust the output voltage and/or the output current of the power supply device 210, the first communication control circuit 222 is configured to communicate with the power supply device 210 to instruct the power supply device 210 to adjust the output voltage and/or the output current of the power supply device 210.

For another example, the first communication control circuit 222 of the wireless charging device 220 can be configured to communicate with the device to be charged 230 during the wireless charging to acquire adjustment information. The adjustment information is for instructing the power supply device 210 to adjust the output voltage and/or the output current of the power supply device 210. The first communication control circuit 222 can be configured to communicate with the power supply device 210 to send the adjustment information to the power supply device 210, whereby the power supply device 210 adjusts the output voltage and/or the output current of the power supply device 210 according to the adjustment information.

It should be understood that, similar to the manner of communication between the wireless charging device 220 and the device to be charged 230, communication between the wireless charging device 220 (or the first communication control circuit 222) and the power supply device 210 can be one-way communication or two-way communication and is not limited herein.

In addition, it should be understood that, the output current of the power supply device can be a constant DC, a pulsating DC, or an AC and is not limited herein.

In the above, the wireless charging device 220 is coupled with the power supply device 210 and acquires power from the power supply device 210. However, implementations of the disclosure are not limited to the above example. Instead, the wireless charging device 220 can be integrated with a function similar to an adaptor, to convert an AC input from outside (such as a mains supply) into the electromagnetic signal. As an implementation, the function of an adaptor can be integrated into the wireless transmission circuit 221 of the wireless charging device 220. Exemplarily, a rectifying circuit, a primary filtering circuit, and/or a transformer can be integrated into the wireless transmission circuit 221. In this way, the wireless transmission circuit 221 can be configured to receive the AC from outside (such as a 220V AC, or referred to as the mains supply) and to generate an electromagnetic signal according to the AC.

In the implementation of the disclosure, the function similar to an adaptor is integrated into the wireless charging device 220, which makes it unnecessary for the wireless charging device 220 to acquire power from an external power supply device, improves integration level of the wireless charging device 220, and decreases the number of components required for wireless charging.

Optionally, in some implementations, the wireless charging device 220 is selectively operable in a first wireless charging mode or in a second wireless charging mode. Charging speed of the wireless charging device 220 charging the device to be charged 230 in the first wireless charging mode is higher than charging speed of the wireless charging device 220 charging the device to be charged 230 in the second wireless charging mode. In other words, compared with the wireless charging device 220 working in the second wireless charging mode, the wireless charging device 220 working in the first wireless charging mode takes less time to fully charge a battery of the same capacity of the device to be charged 230.

The second wireless charging mode can be referred to as a normal charging mode and can be, for example, a conventional wireless charging mode based on the QI standard, the PMA standard, or the A4WP standard. The first wireless charging mode can be referred to as a quick charging mode. The normal wireless charging mode can refer to a wireless charging mode in which the wireless charging device 220 has low transmission power (usually lower than 15 W, the transmission power is mostly 5 W or 10 W). In the normal wireless charging mode, fully charging a battery of high capacity (such as 3000 mA) usually takes several hours. In the quick wireless charging mode, the transmission power of the wireless charging device 220 is higher (usually higher than or equal to 15 W). Compared with the normal wireless charging mode, in the quick wireless charging mode, the wireless charging device 220 can fully charge a battery of the same capacity within a substantially shorter charging period and at a higher charging speed.

Optionally, in some implementations, the first communication control circuit 222 and the second communication control circuit 235 can be configured to conduct two-way communication to control the transmission power of the wireless charging device 220 in the first wireless charging mode.

In addition, in some implementations, the first communication control circuit 222 and the second communication control circuit 235 configured to conduct two-way communication to control the transmission power of the wireless charging device 220 in the first wireless charging mode can be configured to conduct two-way communication to negotiate which wireless charging mode to be enabled for the wireless charging device 220 to charge the device to be charged 230.

Specifically, the first communication control circuit 222 can be configured to conduct handshake communication with the second communication control circuit 235 and control the wireless charging device 220 to charge the device to be charged 230 in the first wireless charging mode when the handshake communication succeeds, or control the wireless charging device 220 to charge the device to be charged 230 in the second wireless charging mode when the handshake communication fails.

The handshake communication can refer to identification of identities of the two communication parties. A successful handshake communication means that both the wireless charging device 220 and the device to be charged 230 are operable in the wireless charging manner with adjustable transmission power. A failed handshake communication means that at least one of the wireless charging device 220 and the device to be charged 230 is not operable in the wireless charging manner with adjustable transmission power.

In the implementations of the disclosure, the wireless charging device 220 does not conduct quick wireless charging on the device to be charged 230 blindly in the first wireless charging mode. Instead, the wireless charging device 220 is configured to conduct two-way communication with the device to be charged 230 to negotiate whether the wireless charging device 220 can conduct quick wireless charging on the device to be charged 230 in the first wireless charging mode, which can improve safety of the charging process.

Specifically, the first communication control circuit 222 configured to conduct two-way communication with the second communication control circuit 235 to negotiate which wireless charging mode to be enabled for the wireless charging device 220 to charge the device to be charged 230 can be configured to send a first instruction to the second communication control circuit 235. The first instruction is configured to ask the device to be charged 230 whether to enable the first wireless charging mode. The first communication control circuit 222 is further configured to receive from the second communication control circuit 235 a reply instruction of the first instruction. The reply instruction is configured to indicate whether the device to be charged 230 agrees to enable the first wireless charging mode. When the device to be charged 230 agrees to enable the first wireless charging mode, the first communication control circuit 222 is configured to control the wireless charging device 220 to charge the device to be charged 230 in the first wireless charging mode.

Besides determining which wireless charging mode to be enabled by negotiating, the first communication control circuit 222 can be further configured to select or switch wireless charging mode according to other factors. Exemplarily, the first communication control circuit 222 can be further configured to control the wireless charging device 220 to charge the battery 232 in the first wireless charging mode or in the second wireless charging mode according to the temperature of the battery 232.

For example, when the temperature is lower than a preset first threshold, such as 5° C. or 10° C., the first communication control circuit 222 can be configured to control the wireless charging device 220 to adopt the second wireless charging mode for normal charging. When the temperature is higher than or equal to the first threshold, the first communication control circuit 222 can be configured to control the wireless charging device 220 to adopt the first wireless charging mode for quick charging. In addition, when the temperature is higher than a high-temperature threshold, such as 50° C., the first communication control circuit 222 can be configured to control the wireless charging device 220 to stop charging.

It should be noted that, the wireless charging manner with adjustable transmission power according to implementations of the disclosure can be adopted to control one or more of the charging stages of the battery 232. For example, the wireless charging manner with adjustable transmission power can be mainly used to control the constant-current charging stage of the battery 232. In other implementations, the device to be charged 230 can still be provided with the conversion circuit. When the battery is in the trickle charging stage or in the constant-voltage charging stage, the conventional wireless charging manner illustrated in FIG. 1 can be adopted for charging. Specifically, when the battery 232 is in the trickle charging stage or in the constant-voltage charging stage, the conversion circuit of the device to be charged 230 can be configured to convert the output voltage and the output current of the wireless reception circuit 231 to make the output voltage and the output current of the wireless reception circuit 231 satisfy requirements on charging in the trickle charging stage or in the constant-voltage charging stage. Compared with charging power of the battery 232 received in the constant-current charging stage, charging power of the battery 232 received in the trickle charging stage or in the constant-voltage charging stage is lower, so conversion efficiency loss and heat accumulation of the conversion circuit of the device to be charged 230 are acceptable, which will be described in detail hereinafter in conjunction with FIG. 6.

Figure 6:
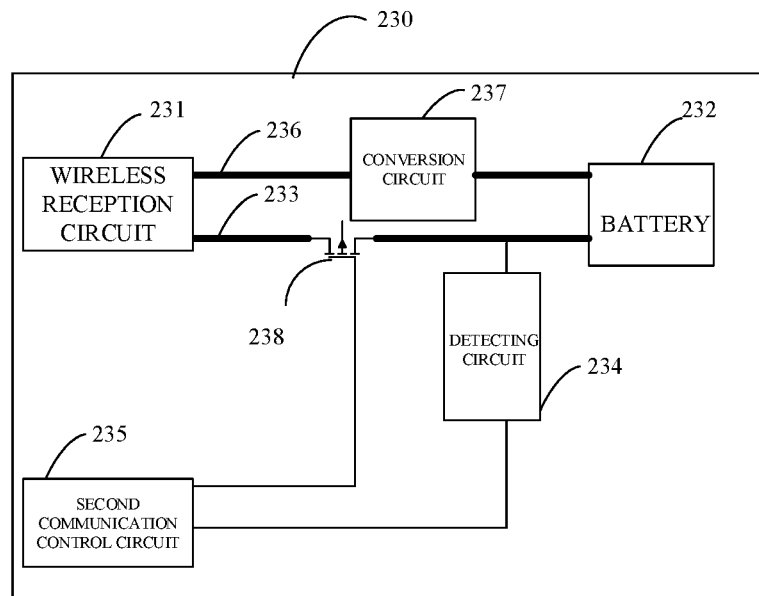
FIG. 6 is a schematic structural diagram illustrating a device to be charged according to an implementation of the present disclosure.

As illustrated in FIG. 6, the device to be charged 230 can further include a second charging channel 236. The second charging channel 236 can be provided with a conversion circuit 237. The conversion circuit 237 can be configured to receive and convert the output current of the wireless reception circuit 231, and charge the battery 232 according to the output current converted. The second communication control circuit 235 can be further configured to control switching between the first charging channel 233 and the second charging channel 236. Exemplarily, as illustrated in FIG. 6, the first charging channel 233 can be provided with the switch 238. The second communication control circuit 235 can be configured to control switching between the first charging channel 233 and the second charging channel 236 by controlling on-off states of the switch 238.

As an implementation, when the battery 232 is in the trickle charging stage and/or in the constant-voltage charging stage, the second communication control circuit 235 can be configured to control to charge the battery 232 through the second charging channel 236. A constant-voltage and/or constant-current process can be controlled by the conversion circuit 237 such as a charging IC. When the battery 232 is in the constant-current charging stage, the second communication control circuit 235 can be configured to control to charge the battery 232 through the first charging channel 233. Constant-current control of the battery can be realized based on adjustment of transmission power by the wireless charging device. With the conversion circuit 237, the device to be charged 230 can be better compatible with the conventional wireless charging manner.

It should be noted that, the manner in which the first charging channel 233 or the second charging channel 236 is selected can be various and is not limited to selection according to the present charging stage of the battery 232.

Optionally, in some implementations, the second communication control circuit 235 can be further configured to conduct handshake communication with the first communication control circuit 222 and control the first charging channel 233 to work when the handshake communication succeeds, or control the second charging channel 236 to work when the handshake communication fails.

The handshake communication can refer to identification of identities of the two communication parties. A successful handshake communication means that both the wireless charging device 220 and the device to be charged 230 are operable in the wireless charging manner with adjustable transmission power. A failed handshake communication means that at least one of the wireless charging device 220 and the device to be charged 230 is not operable in the wireless charging manner with adjustable transmission power. When the handshake communication fails, the conventional wireless charging manner (such as a wireless charging manner based on the QI standard) can be adopted for charging through the second charging channel 236.

Optionally, in some implementations, the second communication control circuit 235 can be further configured to control switching between the first charging channel 233 and the second charging channel 236 according to the temperature of the battery 232.

For example, when the temperature is lower than a preset first threshold, such as 5° C. or 10° C., the second communication control circuit 235 can be configured to control to conduct normal wireless charging through the second charging channel 236. When the temperature is higher than or equal to the first threshold, the second communication control circuit 235 can be configured to control to conduct quick wireless charging through the first charging channel 233. In addition, when the temperature is higher than a high-temperature threshold such as 50° C., the second communication control circuit 235 can be configured to control to stop charging.

As pointed above, the output current of the wireless reception circuit 231 can be a pulsating DC, which can reduce lithium precipitation of the battery 232 and increase service life of the battery. When the output current of the wireless reception circuit 231 is a pulsating DC, the second communication control circuit 235 can be configured to detect a peak value or an average value of the pulsating DC with the detecting circuit 234 to conduct subsequent communication or control according to the peak value or the average value of the pulsating DC.

Figure 7:
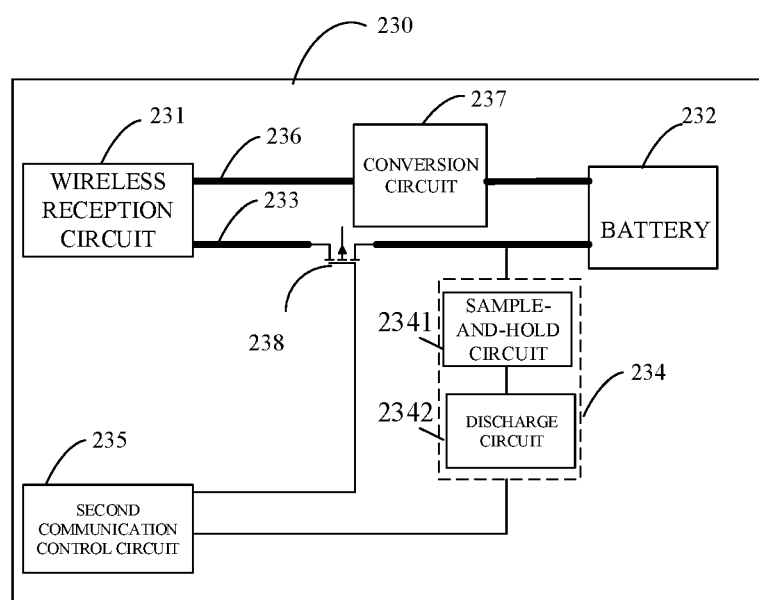
FIG. 7 is a schematic structural diagram illustrating a device to be charged according to another implementation of the present disclosure.

Take the detecting circuit 234 detecting the peak value of the pulsating DC as an example. As illustrated in FIG. 7, the detecting circuit 234 can include a sample-and-hold circuit 2341. The sample-and-hold circuit 2341 can be configured to sample the pulsating DC when the sample-and-hold circuit 2341 is in a sample state and hold a peak current of the pulsating DC when the sample-and-hold circuit 2341 is in a hold state. The second communication control circuit 235 can be further configured to determine whether the sample-and-hold circuit 2341 is in the hold state and obtain the peak current of the pulsating DC held by the sample-and-hold circuit 2341 based on a determination that the sample-and-hold circuit 2341 is in the hold state.

Optionally, in some implementations, the sample-and-hold circuit 2341 can include a capacitor. The sample-and-hold circuit 2341 can be configured to hold the peak current of the pulsating DC based on the capacitor of the sample-and-hold circuit 2341. The detecting circuit 234 can further include a discharge circuit 2342. The second communication control circuit 235 can be further configured to discharge electric charges across the capacitor of the sample-and-hold circuit 2341 via the discharge circuit 2342 to make the sample-and-hold circuit 2341 switch to the sample state from the hold state.

Figure 8:
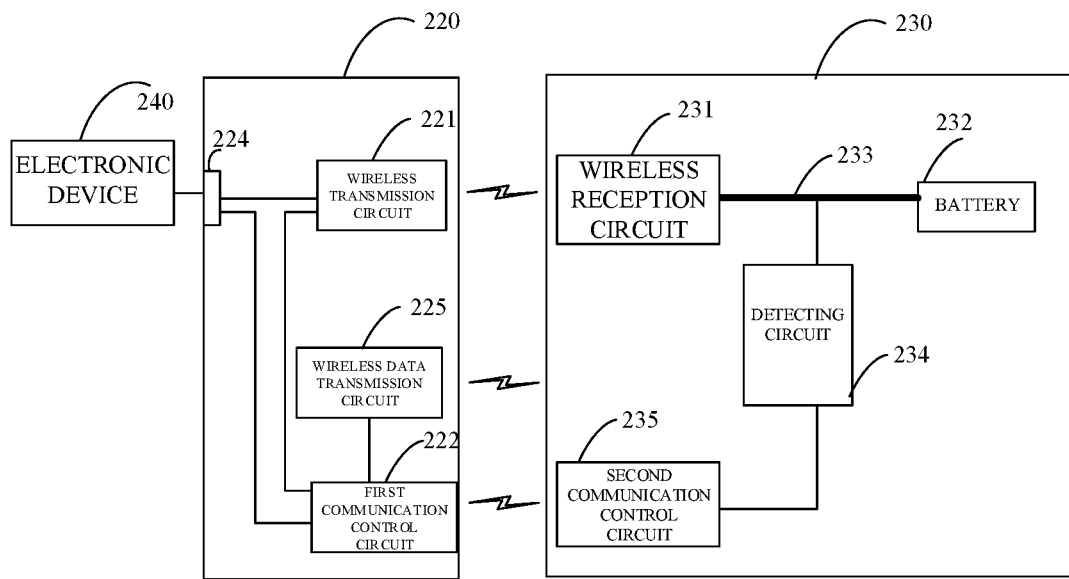
FIG. 8 is a schematic structural diagram illustrating a wireless charging system according to still another implementation of the present disclosure.

Optionally, in some implementations, as illustrated in FIG. 8, the wireless charging device 220 can further include an external interface 224 and a wireless data transmission circuit 225. The external interface 224 can be configured to be coupled with an electronic device 240 with a data processing and transmission function. The external interface 224 and the charging interface mentioned above can refer to one interface, or different interfaces. The wireless charging device 220 can be further configured to conduct wireless charging on the device to be charged 230 according to output power of the electronic device 240 with a data processing and transmission function when the external interface 224 is coupled with the electronic device 240. Specifically, the first communication control circuit 222 of the wireless charging device 220 can be configured to conduct wireless charging on the device to be charged 230 through the wireless transmission circuit 221 according to the output power of the electronic device 240. The first communication control circuit 222 can include, for example, an MCU. The MCU can be configured to conduct overall control on wireless charging, wireless data transmission, and communication of the wireless charging device 220.

The wireless data transmission circuit 225 can be configured to transmit data (such as data content or data file) stored in the electronic device 240 to the device to be charged 230 via a wireless link, or transmit data (such as data content or data file) stored in the device to be charged 230 to the electronic device 240 via the wireless link, when the wireless charging device 220 conducts wireless charging on the device to be charged 230 according to the output power of the electronic device 240.

The wireless charging device 220 in the implementations of the disclosure can be configured not only to conduct wireless charging on the device to be charged according to the output power of the electronic device but also achieve wireless data transmission between the electronic device and the device to be charged during the wireless charging without extra data line, thereby simplifying operations of user.

The manner of data transmission between the wireless data transmission circuit 225 and the device to be charged 230 is not limited herein. As an implementation, the data transmission between the wireless data transmission circuit 225 and the device to be charged 230 can be achieved based on Bluetooth®, in this case, the wireless data transmission circuit 225 can be a Bluetooth® transmitter, and the device to be charged 230 can include a Bluetooth® receiver (not illustrated in FIG. 8). As another implementation, the data transmission between the wireless data transmission circuit 225 and the device to be charged 230 can be achieved based on wireless fidelity (WiFi), here, the wireless data transmission circuit 225 can be a wireless signal transmission circuit including circuits or components such as a baseband processor, a radio frequency circuit, a transmission antenna, etc, and the device to be charged 230 can be a wireless signal reception circuit (not illustrated in FIG. 8) including a reception antenna, a radio frequency circuit, a baseband processor, etc.

The manner in which the wireless charging device 220 conducts the wireless charging on the device to be charged 230 according to the output power of the electronic device 240 is not limited herein. As an implementation, the wireless charging device 220 can adopt the wireless charging manner with adjustable transmission power provided herein to conduct the wireless charging on the device to be charged 230, so as to make the output voltage and/or the output current of the wireless reception circuit 231 match the present charging stage of the battery 232.

As another implementation, the wireless charging device 220 can adjust transmission power in a conventional manner when the wireless charging device 220 is coupled with the electronic device 240. For example, the transmission power of the wireless transmission circuit 221 can be negotiated in advance and controlled to be constant during wireless charging. When the wireless charging device 220 is coupled with a specialized power supply device (such as an adaptor), the wireless charging device 220 can adopt the wireless charging manner with adjustable transmission power to conduct wireless charging on the device to be charged 230, so as to make the output voltage and/or the output current of the wireless reception circuit 231 match the present charging stage of the battery 232.

For example, the electronic device is a host device, and the wireless charging device 220 is a wireless charging base. When the host device is coupled with the wireless charging base via an external interface of the wireless charging base, the wireless charging device 220 can be configured to identify power that the host device is able to provide and type of data interchanged (such as data in USB 2.0 format, data in USB 3.0 format, image data, audio and video data, etc.) that the host device supports. Then, the wireless charging device 220 can be configured to provide multiple power grades for the device to be charged 230 according to output power that the host device is able to provide and rules of the conventional wireless charging standard (such as the QI standard or the A4WP standard). Examples of the multiple power grades can include a low power grade (such as 5 W) and an average power grade (such as 10 W and/or 15 W). Certainly, when the host device is able to provide even higher power, implementations of the disclosure can further extend the conventional wireless charging standard (such as the QI standard or the A4WP standard), thereby providing an even higher power grade for the device to be charged 230.

The wireless data transmission circuit 225 can be configured to transmit at least one of data in USB protocol format, data in display port (DP) protocol format, and data in mobile high-definition link (MHL) protocol format. In addition, in some implementations, the wireless data transmission circuit 225 can be configured to transmit data in multiple protocol formats. Exemplarily, the wireless data transmission circuit 225 can be configured to transmit both data in USB protocol format and data in MHL protocol format.

The type of the electronic device 240 is not limited herein. In some implementations, the electronic device 240 can be the host device. In other implementations, the electronic device 240 can be a computer or a smart TV.

Figure 9:
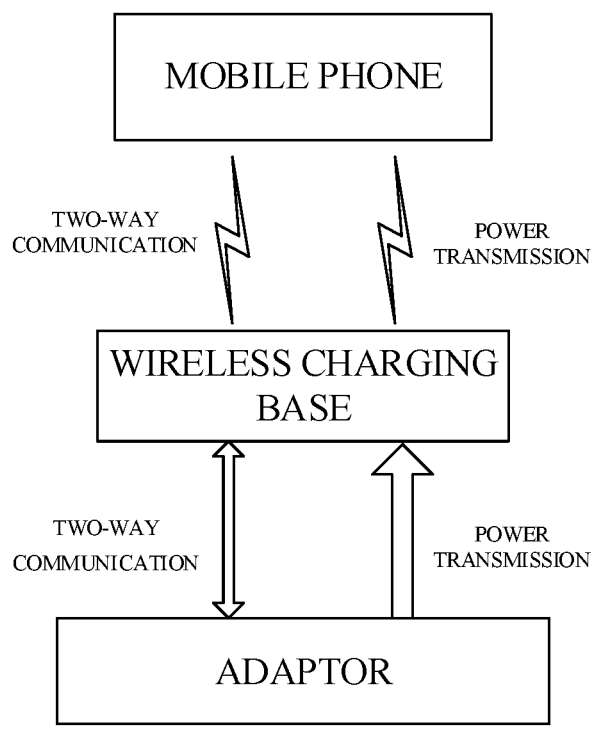
FIG. 9 is a schematic structural diagram illustrating a wireless charging system according to still another implementation of the present disclosure.

The following will describe implementations of the disclosure in further detail in conjunction with specific examples. Illustrated in FIG. 9 is an example where the wireless charging device is a wireless charging base, the power supply device is an adaptor, and the device to be charged is a mobile phone. It should be noted that, the example illustrated in FIG. 9 is just for those skilled in the art to understand implementations of the disclosure, instead of limiting the implementations of the disclosure to specific numeric values or specific situations of the examples. According to the example illustrated in FIG. 9, those skilled in the art can obviously conduct various equivalent modifications and amendments without departing from the scope of the implementations of the disclosure.

At Step 1, the mobile phone conducts wireless communication with the wireless charging base.

Specifically, communication protocol of two-way communication between the mobile phone and the wireless charging base can be defined by a manufacturer. In addition, communication between the mobile phone and the wireless charging base can be conducted based on Bluetooth®, Wi-Fi, or backscatter modulation.

At Step 2, the wireless charging base conducts wired two-way communication with the adaptor.

Specifically, communication protocol of two-way communication between the wireless charging base and the adaptor can be defined by a manufacturer. In addition, the wireless charging base can communicate with the adaptor via a USB cable (such as a D+data line and a D−data line of a USB cable).

At Step 3, the wireless charging base is coupled with the adaptor and conducts communication handshake with the adaptor.

Specifically, the wireless charging base can conduct communication handshake with the adaptor after being coupled with the adaptor to determine type of the adaptor and power grades that the adaptor is able to provide.

At Step 4, the wireless charging base is coupled with the mobile phone and conduct communication handshake with the mobile phone.

Specifically, the wireless charging base can conduct communication handshake with the mobile phone after being coupled with the mobile phone to determine type of the mobile phone and power grades that the mobile phone supports.

At Step 5, the wireless charging device starts wireless charging after handshake between the mobile phone and with the adaptor is successful.

A wireless reception circuit of the mobile phone can be configured to conduct direct charging on a battery. In order to adjust in real time output voltage or output current of the wireless reception circuit according to a present charging stage of the battery, a communication control circuit of the mobile phone can be configured remain in communication with the wireless charging base during wireless charging to instruct the wireless charging base to adjust in real time transmission power of a wireless transmission circuit. For instance, the communication control circuit of the mobile phone can be configured to acquire in real time present state of the battery and send adjustment information to the wireless charging device according to the present state of the battery. The adjustment information is used to adjust output voltage or output current of the adaptor. The wireless charging device can be configured to conduct two-way communication with the adaptor after receiving the adjustment information to instruct the adaptor to adjust the output voltage and/or the output current of the adaptor.

It should be noted that, when the wireless charging base fails to conduct handshake with any one of the mobile phone and the adaptor, the wireless charging base can be configured to adopt the conventional wireless charging manner for charging. Exemplarily, the wireless charging base can be configured to conduct wireless charging on the device to be charged based on the QI standard with a 5W power (corresponding to a low power grade of the QI standard).

Apparatus implementations of the disclosure have been described in detail above in conjunction with FIG. 2 to FIG. 9. The following will describe in detail method implementations of the disclosure in conjunction with FIG. 10 to FIG. 12. Apparatus implementations and method implementations correspond to each other. Therefore, method implementations without detailed description can refer to the apparatus implementations above.

FIG. 10 is a schematic flowchart illustrating a wireless charging method according to an implementation of the present disclosure. The method illustrated in FIG. 10 can be executed by a wireless charging system (such as the wireless charging system 200 mentioned above). The wireless charging system includes a wireless charging device and a device to be charged.

The wireless charging device includes a wireless transmission circuit, an external interface, and a wireless data transmission circuit. The wireless transmission circuit is configured to transmit an electromagnetic signal to conduct wireless charging on the device to be charged. The wireless charging device is configured to conduct wireless charging on the device to be charged according to output power of an electronic device with a data processing and transmission function, when the external interface is coupled with the electronic device. The wireless data transmission circuit is configured to transmit data stored in the electronic device to the device to be charged via a wireless link, or transmit data stored in the device to be charged to the electronic device via the wireless link, when the wireless charging device conducts the wireless charging on the device to be charged according to the output power of the electronic device. The device to be charged includes a battery, a wireless reception circuit, a first charging channel, and a detecting circuit. The wireless reception circuit is configured to receive the electromagnetic signal and convert the electromagnetic signal into output voltage and output current of the wireless reception circuit. Through the first charging channel, the output voltage and the output current of the wireless reception circuit are received and provided to the battery for charging. The detecting circuit is configured to detect the output voltage and/or the output current of the wireless reception circuit.

The method illustrated in FIG. 10 includes the following.

At 1010, the device to be charged conducts wireless communication with the wireless charging device according to the output voltage and/or the output current of the wireless reception circuit detected by the detecting circuit, whereby the wireless charging device adjusts transmission power of the wireless transmission circuit to make the output voltage and/or the output current of the wireless reception circuit match a present charging stage of the battery.

Optionally, in some implementations, the method illustrated in FIG.10 can further include the following. The wireless charging device communicates with the power supply device to negotiate output power of the power supply device.

Optionally, in some implementations, the wireless charging device can communicate with the power supply device to negotiate output power of the power supply device as follows. The wireless charging device communicates with the power supply device to negotiate a maximum output power of the power supply device. The wireless charging device can adjust the transmission power of the wireless transmission circuit as follows. The wireless charging device adjusts amount of power extracted by the wireless transmission circuit from the maximum output power of the power supply device to adjust the transmission power of the wireless transmission circuit, when the wireless transmission circuit conducts wireless charging on the device to be charged according to the maximum output power of the power supply device.

Optionally, in some implementations, the wireless charging device can adjust the transmission power of the wireless transmission circuit as follows. The wireless charging device communicates with the power supply device to adjust the output voltage and/or the output current of the power supply device to adjust the transmission power of the wireless transmission circuit.

Optionally, in some implementations, the device to be charged can conduct the wireless communication with the wireless charging device according to the output voltage and/or the output current of the wireless reception circuit detected by the detecting circuit as follows, whereby the wireless charging device adjusts the transmission power of the wireless transmission circuit. The device to be charged sends adjustment information to the wireless charging device. The adjustment information is for instructing the wireless charging device to adjust the output voltage and/or the output current of the power supply device.

Optionally, in some implementations, the present charging stage of the battery includes at least one of a trickle charging stage, a constant-voltage charging stage, and a constant-current charging stage.

Optionally, in some implementations, the device to be charged can conduct the wireless communication with the wireless charging device according to the output voltage and/or the output current of the wireless reception circuit detected by the detecting circuit as follows, whereby the wireless charging device adjusts the transmission power of the wireless transmission circuit according to the output voltage and/or the output current of the wireless reception circuit. In the constant-voltage charging stage of the battery, the device to be charged conducts the wireless communication with the wireless charging device according to the output voltage and/or the output current of the wireless reception circuit detected by the detecting circuit, whereby the wireless charging device adjusts the transmission power of the wireless transmission circuit to make the output voltage of the wireless reception circuit match charging voltage corresponding to the constant-voltage charging stage.

Optionally, in some implementations, the device to be charged can conduct the wireless communication with the wireless charging device according to the output voltage and/or the output current of the wireless reception circuit detected by the detecting circuit as follows, whereby the wireless charging device adjusts the transmission power of the wireless transmission circuit according to the output voltage and/or the output current of the wireless reception circuit. In the constant-current charging stage of the battery, the device to be charged conducts the wireless communication with the wireless charging device according to the output voltage and/or the output current of the wireless reception circuit detected by the detecting circuit, whereby the wireless charging device adjusts the transmission power of the wireless transmission circuit to make the output current of the wireless reception circuit match charging current corresponding to the constant-current charging stage.

Optionally, in some implementations, the method illustrated in FIG. 10 can further include the following. The device to be charged sends state information of the battery to the wireless charging device, whereby the wireless charging device adjusts the transmission power of the wireless transmission circuit according to the state information of the battery. The state information of the battery is indicative of present power and/or present voltage of the battery of the device to be charged.

Optionally, in some implementations, communication information transmitted between the wireless charging device and the device to be charged includes at least one of temperature information of the battery, information indicative of a peak value or an average value of the output voltage of the wireless reception circuit, information indicative of a peak value or an average value of the output current of the wireless reception circuit, information indicative of over-voltage protection or over-current protection, and power-transmission efficiency information indicative of efficiency in power transmission between the wireless transmission circuit and the wireless reception circuit.

Optionally, in some implementations, the communication information includes the power-transmission efficiency information. The method illustrated in FIG. 10 can further include the following. The wireless charging device determines adjustment range of the transmission power of the wireless transmission circuit according to the power-transmission efficiency information.

Optionally, in some implementations, the device to be charged further includes a second charging channel provided with a conversion circuit. The conversion circuit is configured to receive and convert the output current of the wireless reception circuit and charge the battery according to the output current converted. The method illustrated in FIG. 10 can further include the following. The device to be charged controls switching between the first charging channel and the second charging channel.

Optionally, in some implementations, the method illustrated in FIG. 10 can further include the following. The device to be charged conducts handshake communication with the wireless charging device and controls the first charging channel to work when the handshake communication succeeds, or controls the second charging channel to work when the handshake communication fails.

Optionally, in some implementations, the method illustrated in FIG. 10 can further include the following. The device to be charged controls switching between the first charging channel and the second charging channel according to temperature of the battery.

Optionally, in some implementations, the wireless charging device is operable in a first wireless charging mode or a second wireless charging mode. Charging speed of the wireless charging device charging the device to be charged in the first wireless charging mode is higher than charging speed of the wireless charging device charging the device to be charged in the second wireless charging mode.

Optionally, in some implementations, the method illustrated in FIG. 10 can further include the following. The wireless charging device communicates with the device to be charged to negotiate which one of the first wireless charging mode and the second wireless charging mode to be enabled for wireless charging.

Optionally, in some implementations, the wireless charging device can communicate with the device to be charged to negotiate which one of the first wireless charging mode and the second wireless charging mode to be enabled for wireless charging as follows. The wireless charging device conducts handshake communication with the device to be charged and controls the wireless charging device to charge the device to be charged in the first wireless charging mode when the handshake communication succeeds, or controls the wireless charging device to charge the device to be charged in the second wireless charging mode when the handshake communication fails.

Optionally, in some implementations, the method illustrated in FIG. 10 can further include the following. The wireless charging device controls to charge the device to be charged in the first wireless charging mode or in the second wireless charging mode according to the temperature of the battery.

FIG. 11 is a schematic flowchart illustrating a wireless charging method according to another implementation of the present disclosure. The method illustrated in FIG. 11 can be executed by a wireless charging device (such as the wireless charging device 220 mentioned above). The wireless charging device includes a wireless transmission circuit, an external interface, and a wireless data transmission circuit. The wireless transmission circuit is configured to transmit an electromagnetic signal to conduct wireless charging on a device to be charged. The wireless charging device is configured to conduct wireless charging on the device to be charged according to output power of an electronic device with a data processing and transmission function, when the external interface is coupled with the electronic device. The wireless data transmission circuit is configured to transmit data stored in the electronic device to the device to be charged via a wireless link, or transmit data stored in the device to be charged to the electronic device via the wireless link, when the wireless charging device conducts the wireless charging on the device to be charged according to the output power of the electronic device.

The method illustrated in FIG. 11 includes the following.

At 1110, conduct wireless communication with the device to be charged during wireless charging, to adjust transmission power of the wireless transmission circuit, so as to make output voltage and/or output current of a wireless reception circuit of the device to be charged match a present charging stage of a battery of the device to be charged.

Optionally, in some implementations, the wireless charging device further includes a charging interface. The wireless transmission circuit is further configured to receive output voltage and output current from a power supply device via the charging interface and generate the electromagnetic signal according to the output voltage and the output current of the power supply device.

Optionally, in some implementations, the method illustrated in FIG. 11 can further include communicating with the power supply device to negotiate output power of the power supply device.

Optionally, in some implementations, communicating with the power supply device to negotiate the output power of the power supply device can include the following. Communicate with the power supply device to negotiate a maximum output power of the power supply device. Adjusting the transmission power of the wireless transmission circuit can include the following. Adjust amount of power extracted by the wireless transmission circuit from the maximum output power of the power supply device to adjust the transmission power of the wireless transmission circuit, when the wireless transmission circuit conducts wireless charging on the device to be charged according to the maximum output power of the power supply device.

Optionally, in some implementations, adjusting the transmission power of the wireless transmission circuit can include the following. Communicate with the power supply device to adjust the output voltage and/or the output current of the power supply device to adjust the transmission power of the wireless transmission circuit.

Optionally, in some implementations, conducting the wireless communication with the device to be charged during the wireless charging to adjust the transmission power of the wireless transmission circuit can include the following. Receive adjustment information from the device to be charged. The adjustment information is for instructing the wireless charging device to adjust the output voltage and/or the output current of the power supply device.

Optionally, in some implementations, the charging stage of the battery includes at least one of a trickle charging stage, a constant-voltage charging stage, and a constant-current charging stage.

Optionally, in some implementations, conducting the wireless communication with the device to be charged during the wireless charging to adjust the transmission power of the wireless transmission circuit can include the following, so as to make the output voltage and/or the output current of the wireless reception circuit of the device to be charged match the present charging stage of the battery. Conduct the wireless communication with the device to be charged in the constant-voltage charging stage of the battery, to adjust the transmission power of the wireless transmission circuit to make the output voltage of the wireless reception circuit match charging voltage corresponding to the constant-voltage charging stage.

Optionally, in some implementations, conducting the wireless communication with the device to be charged during the wireless charging to adjust the transmission power of the wireless transmission circuit can include the following, so as to make at least one of the output voltage and the output current of the wireless reception circuit of the device to be charged match the present charging stage of the battery. Conduct the wireless communication with the device to be charged in the constant-current charging stage of the battery, to adjust the transmission power of the wireless transmission circuit to make the output current of the wireless reception circuit match charging current corresponding to the constant-current charging stage.

Optionally, in some implementations, the method illustrated in FIG. 11 can further include the following. Receive from the device to be charged state information of the battery and adjust the transmission power of the wireless transmission circuit according to the state information of the battery. The state information of the battery is indicative of present power and/or present voltage of the battery.

Optionally, in some implementations, communication information transmitted between the wireless charging device and the device to be charged includes at least one of temperature information of the battery, information indicative of a peak value or an average value of output current of the wireless reception circuit, information indicative of a peak value or an average value of output voltage of the wireless reception circuit, information indicative of over-voltage protection or over-current protection, and power-transmission efficiency information indicative of efficiency in power transmission between the wireless transmission circuit and the wireless reception circuit.

Optionally, in some implementations, the communication information includes the power-transmission efficiency information. The method illustrated in FIG. 11 can further include determining adjustment range of the transmission power of the wireless transmission circuit according to the power-transmission efficiency information.

Optionally, in some implementations, the wireless charging device is operable in a first wireless charging mode or a second wireless charging mode. Charging speed of the wireless charging device charging the device to be charged in the first wireless charging mode is higher than charging speed of the wireless charging device charging the device to be charged in the second wireless charging mode.

Optionally, in some implementations, the method illustrated in FIG. 11 can further include the following. Communicate with the device to be charged to negotiate which one of the first wireless charging mode and the second wireless charging mode to be enabled for wireless charging.

Optionally, in some implementations, communicating with the device to be charged to negotiate which one of the first wireless charging mode and the second wireless charging mode to be enabled for wireless charging can include the following. Conduct handshake communication with the device to be charged and control the wireless charging device to charge the device to be charged in the first wireless charging mode when the handshake communication succeeds, or control the wireless charging device to charge the device to be charged in the second wireless charging mode when the handshake communication fails.

Optionally, in some implementations, the method illustrated in FIG. 11 can further include the following. Control the wireless charging device to charge the device to be charged in the first wireless charging mode or in the second wireless charging mode according to temperature of the battery.

FIG. 12 is a schematic flowchart illustrating a wireless charging method according to yet another implementation of the present disclosure. The method illustrated in FIG. 12 can be executed by a device to be charged (such as the device to be charged 230 mentioned above). The device to be charged includes a battery, a wireless reception circuit, a first charging channel, and a detecting circuit. The wireless reception circuit is configured to receive an electromagnetic signal from a wireless charging device and convert the electromagnetic signal into output voltage and output current of the wireless reception circuit. Through the first charging channel, the output voltage and the output current of the wireless reception circuit are received and provided to the battery for charging. The detecting circuit is configured to detect the output voltage and/or the output current of the wireless reception circuit.

The method illustrated in FIG. 12 includes the following.

At 1210, conduct wireless communication with the wireless charging device according to the output voltage and/or the output current of the wireless reception circuit detected by the detecting circuit, whereby the wireless charging device adjusts transmission power thereof to make the output voltage and/or the output current of the wireless reception circuit match a present charging stage of the battery.

Optionally, in some implementations, conducting wireless communication with the wireless charging device according to the output voltage and/or the output current of the wireless reception circuit detected by the detecting circuit, whereby the wireless charging device adjusts transmission power thereof includes the following.

Adjustment information is sent to the wireless charging device. The adjustment information is for instructing the wireless charging device to adjust the output voltage and/or the output current of a power supply device.

Optionally, in some implementations, the charging stage of the battery includes at least one of a trickle charging stage, a constant-voltage charging stage, and a constant-current charging stage.

Optionally, in some implementations, conducting wireless communication with the wireless charging device according to the output voltage and/or the output current of the wireless reception circuit detected by the detecting circuit, whereby the wireless charging device adjusts transmission power thereof to make the output voltage and/or the output current of the wireless reception circuit match a present charging stage of the battery can include the following. In the constant-voltage charging stage of the battery, conduct the wireless communication with the wireless charging device according to the output voltage and/or the output current of the wireless reception circuit detected by the detecting circuit, to adjust the transmission power of the wireless charging device to make the output voltage of the wireless reception circuit match charging voltage corresponding to the constant-voltage charging stage.

Optionally, in some implementations, conducting wireless communication with the wireless charging device according to the output voltage and/or the output current of the wireless reception circuit detected by the detecting circuit, whereby the wireless charging device adjusts transmission power thereof to make the output voltage and/or the output current of the wireless reception circuit match a present charging stage of the battery can include the following. In the constant-current charging stage of the battery, conduct the wireless communication with the wireless charging device according to the output voltage and/or the output current of the wireless reception circuit detected by the detecting circuit, to adjust the transmission power of the wireless charging device to make the output current of the wireless reception circuit match charging current corresponding to the constant-current charging stage.

Optionally, in some implementations, the method illustrated in FIG. 12 can further include the following. Send state information of the battery to the wireless charging device whereby the wireless charging device adjusts the transmission power of the wireless transmission circuit according to the state information of the battery. The state information of the battery is indicative of present power and/or present voltage of the battery of the device to be charged.

Optionally, in some implementations, communication information transmitted between the device to be charged and the wireless charging device includes at least one of temperature information of the battery, information indicative of a peak value or an average value of the output current of the wireless reception circuit, information indicative of a peak value or an average value of the output voltage of the wireless reception circuit, information indicative of over-voltage protection or over-current protection, and power-transmission efficiency information indicative of efficiency in power transmission between the wireless transmission circuit and the wireless reception circuit.

Optionally, in some implementations, the device to be charged can further include a second charging channel provided with a conversion circuit. The conversion circuit is configured to receive and convert the output current of the wireless reception circuit and charge the battery according to the output current converted. The method illustrated in FIG. 12 can further include controlling switching between the first charging channel and the second charging channel.

Optionally, in some implementations, the method illustrated in FIG. 12 can further include the following. Conduct handshake communication with the wireless charging device and control the first charging channel to work when the handshake communication succeeds, or control the second charging channel to work when the handshake communication fails.

Optionally, in some implementations, the method illustrated in FIG. 12 can further include the following. Control switching between the first charging channel and the second charging channel according to temperature of the battery.

Optionally, in some implementations, the wireless charging device is selectively operable in a first wireless charging mode or in a second wireless charging mode. Charging speed of the wireless charging device charging the device to be charged in the first wireless charging mode is higher than charging speed of the wireless charging device charging the device to be charged in the second wireless charging mode. The method illustrated in FIG. 12 can further include communicating with the wireless charging device to negotiate which one of the first wireless charging mode and the second wireless charging mode to be enabled for wireless charging.

All or part of the above implementations can be implemented through software, hardware, firmware, or any other combination thereof. When implemented by software, all or part of the above implementations can be implemented in the form of a computer program product. The computer program product includes one or more computer instructions. When the computer instructions are applied and executed on a computer, all or part of the operations or functions of the implementations of the disclosure are performed. The computer can be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fibre, a digital subscriber line (DSL), etc. The wireless manner can be, for example, infrared, wireless, microwave, etc. The computer readable storage medium can be any computer accessible usable-medium or a data storage device such as a server, a data centre, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

Those of ordinary skill in the art will appreciate that units (including sub-units) and algorithmic operations of various examples described in connection with implementations herein can be implemented by electronic hardware or by a combination of computer software and electronic hardware. Whether these functions are performed by means of hardware or software depends on the application and the design constraints of the associated technical solution. A professional technician may use different methods with regard to each particular application to implement the described functionality, but such methods should not be regarded as lying beyond the scope of the disclosure.

It will be appreciated that the systems, apparatuses, and methods disclosed in implementations herein may also be implemented in various other manners. For example, the above apparatus implementations are merely illustrative, e.g., the division of units (including sub-units) is only a division of logical functions, and there may exist other ways of division in practice, e.g., multiple units (including sub-units) or components may be combined or may be integrated into another system, or some features may be ignored or not included. In other respects, the coupling or direct coupling or communication connection as illustrated or discussed may be an indirect coupling or communication connection through some interface, device or unit, and may be electrical, mechanical, or otherwise.

Separated units (including sub-units) as illustrated may or may not be physically separated. Components or parts displayed as units (including sub-units) may or may not be physical units, and may reside at one location or may be distributed to multiple networked units. Some or all of the units (including sub-units) may be selectively adopted according to practical needs to achieve desired objectives of the disclosure.

Additionally, various functional units (including sub-units) described in implementations herein may be integrated into one processing unit or may be present as a number of physically separated units, and two or more units may be integrated into one.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A device to be charged, comprising:
   a battery;
   a wireless reception circuit, configured to receive an electromagnetic signal from a wireless charging device and convert the electromagnetic signal into an output voltage and an output current of the wireless reception circuit, wherein the wireless reception circuit converts the electromagnetic signal transmitted from the wireless transmission circuit into an alternating current (AC) and then rectifies and/or filters the AC to convert the AC into the output voltage and output current of the wireless reception circuit;
   a first charging channel, through which the output voltage and the output current of the wireless reception circuit are received and provided to the battery for charging;
   a detecting circuit, configured to detect at least one of the output voltage and the output current of the wireless reception circuit;
   a communication control circuit, configured to conduct wireless communication with the wireless charging device according to at least one of the output voltage and the output current of the wireless reception circuit detected by the detecting circuit, whereby the wireless charging device adjusts transmission power thereof, to make at least one of the output voltage and the output current of the wireless reception circuit match a present charging stage of the battery, wherein the present charging stage of the battery comprises one selected from a trickle charging stage, a constant-current charging stage, and a constant-voltage charging stage; and
   a second charging channel provided with a conversion circuit, wherein the conversion circuit is configured to receive and convert the output current of the wireless reception circuit and charge the battery according to the output current converted,
   wherein the communication control circuit is further configured to control switching between the first charging channel and the second charging channel,
   wherein the communication control circuit is further configured to control switching between the first charging channel and the second charging channel according to handshake communication with the wireless charging device, and
   wherein the communication control circuit is further configured to control the first charging channel to work when the handshake communication succeeds or control the second charging channel to work when the handshake communication fails.

2. The device to be charged of claim 1, wherein the communication control circuit configured to conduct the wireless communication with the wireless charging device is configured to:
   send adjustment information to the wireless charging device, wherein the adjustment information is for instructing the wireless charging device to adjust at least one of an output voltage and an output current of a power supply device.

3. The device to be charged of claim 1, wherein the communication control circuit is further configured to send state information of the battery to the wireless charging device, whereby the wireless charging device adjusts the transmission power of the wireless transmission circuit according to the state information of the battery, wherein the state information of the battery is indicative of present power and/or present voltage of the battery of the device to be charged.

4. The device to be charged of claim 1, wherein
   the output current of the wireless reception circuit is a pulsating DC;
   the detecting circuit comprises a sample-and-hold circuit, and the sample-and-hold circuit is configured to sample the pulsating DC when the sample-and-hold circuit is in a sample state and hold a peak current of the pulsating DC when the sample-and-hold circuit is in a hold state; and
   the communication control circuit is further configured to determine whether the sample-and-hold circuit is in the hold state and obtain the peak current of the pulsating DC held by the sample-and-hold circuit based on a determination that the sample-and-hold circuit is in the hold state.

5. The device to be charged of claim 1, wherein the wireless charging device is operable in a first wireless charging mode or in a second wireless charging mode, charging speed of the wireless charging device charging the device to be charged in the first wireless charging mode is higher than charging speed of the wireless charging device charging the device to be charged in the second wireless charging mode.

6. A wireless charging method, comprising: conducting, by a wireless charging device, wireless communication with a device to be charged of claim 1 during wireless charging to adjust transmission power of a wireless transmission circuit of the wireless charging device, to make at least one of an output voltage and an output current of a wireless reception circuit of the device to be charged match a present charging stage of a battery of the device to be charged.

* * * * *